United States Patent
Li et al.

(10) Patent No.: US 10,560,239 B2
(45) Date of Patent: Feb. 11, 2020

(54) REFERENCE SIGNAL MAPPING METHOD AND DEVICE

(71) Applicant: CHINA ACADEMY OF TELECOMUNICATIONS TECHNOLOGY, Beijing (CN)

(72) Inventors: Hui Li, Beijing (CN); Qiubin Gao, Beijing (CN); Runhua Chen, Beijing (CN); Rakesh Tamrakar, Beijing (CN); Wenhong Chen, Beijing (CN)

(73) Assignee: CHINA ACADEMY OF TELECOMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/082,529

(22) PCT Filed: Feb. 8, 2017

(86) PCT No.: PCT/CN2017/073077
§ 371 (c)(1),
(2) Date: Sep. 5, 2018

(87) PCT Pub. No.: WO2017/152730
PCT Pub. Date: Sep. 14, 2017

(65) Prior Publication Data
US 2019/0089497 A1    Mar. 21, 2019

(30) Foreign Application Priority Data

Mar. 10, 2016 (CN) .......................... 2016 1 0136905

(51) Int. Cl.
*H04L 5/00* (2006.01)
*H04B 7/0456* (2017.01)
*H04B 7/06* (2006.01)

(52) U.S. Cl.
CPC ........... *H04L 5/005* (2013.01); *H04B 7/0473* (2013.01); *H04B 7/066* (2013.01); *H04B 7/0626* (2013.01); *H04L 5/006* (2013.01); *H04L 5/0007* (2013.01)

(58) Field of Classification Search
CPC ..... H04L 5/0023; H04L 5/005; H04L 5/0007; H04L 5/006; H04B 7/0626; H04B 7/068;
(Continued)

(56) References Cited

U.S. PATENT DOCUMENTS

| 2013/0215823 A1 | 8/2013 | Shin et al. |
| 2015/0244508 A1 | 8/2015 | Kim et al. |

(Continued)

FOREIGN PATENT DOCUMENTS

| CN | 101873626 A | 10/2010 |
| CN | 102223212 A | 10/2011 |

(Continued)

OTHER PUBLICATIONS

The First Office Action dated Dec. 13, 2016 in CN application No. 201310045899.4 (CN 103974315 A) with translation from Global Dossier.

(Continued)

*Primary Examiner* — Rahel Guarino
(74) *Attorney, Agent, or Firm* — Ladas & Parry, LLP

(57) ABSTRACT

The present disclosure provides a reference signal mapping method and a reference signal mapping device. An N-port reference signal pattern is acquired in accordance with a 4-port or 8-port reference signal pattern, and N is an integer greater than 16. The N-port reference signal pattern includes an 18-port, 20-port, 24-port, 28-port or 32-port reference signal pattern. In the case of mapping a reference signal, RE positions to which a CSI-RS is mapped are determined in accordance with the N-port reference signal pattern, and
(Continued)

--- determining Resource Elements (REs) to which a Channel State Indication Reference Signal (CSI-RS) is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8 — 301 performing resource mapping on the CSI-RS in accordance with the determined REs — 302 resource mapping is performed on the CSI-RS in accordance with the RE positions, so as to map more-than-16-port CSI-RS, thereby to transmit the more-than-16-port CSI-RS.

19 Claims, 19 Drawing Sheets

(58) Field of Classification Search
CPC .... H04B 7/0413; H04B 7/066; H04B 7/0473; H04W 72/042; H04W 72/0413; H04W 72/0446
See application file for complete search history.

(56) References Cited

U.S. PATENT DOCUMENTS

| | | | |
|---|---|---|---|
| 2015/0257132 A1 | 9/2015 | Park et al. | |
| 2015/0318973 A1 | 11/2015 | Wang et al. | |
| 2015/0350942 A1 | 12/2015 | Wei et al. | |
| 2016/0094326 A1* | 3/2016 | Moon ............... | H04L 5/0026 370/330 |
| 2016/0242060 A1 | 8/2016 | Kakishima et al. | |

FOREIGN PATENT DOCUMENTS

| | | |
|---|---|---|
| CN | 102571284 A | 7/2012 |
| CN | 1 03179664 A | 6/2013 |
| CN | 103347298 A | 10/2013 |
| CN | 103974315 A | 8/2014 |
| CN | 104767592 A | 7/2015 |
| JP | 2014527772 A | 10/2014 |
| JP | 2015070335 A | 4/2015 |
| WO | 2014042422 A2 | 3/2014 |
| WO | 2014051374 A1 | 4/2014 |
| WO | 2017078798 A1 | 5/2017 |

OTHER PUBLICATIONS

The Second Office Action dated Jun. 14, 2017 in CN application No. 201310045899.4 (CN 103974315 A) with translation from Global Dossier.
The Third Office Action dated Sep. 1, 2017in CN application No. 201310045899.4 (CN 103974315 A) with translation from Global Dossier.
Alcatel-Lucent Shanghai Bell, Alcatel-Lucent. 3GPP TSG-RAN WG1 #66. *Considerations on CSI feedback enhancements for high-priority antenna configurations.* Aug. 26, 2011. Athens, Greece.
Huawei, HiSilicon. 3GPP TSG RAN WG1 Meeting #72. *Use scenarios for elevation beamforming.* Jan. 28-Feb. 1, 2013. St. Julian's, Malta.
International Search Report for PCT/CN2017/073077 dated May 4, 2017 and its English translation provided by WIPO.
Written Opinion of the International Search Authority PCT/CN2017/073077 dated May 4, 2017 and its English translation provided by Google Translate.
The First Office Action dated Dec. 13, 2016 in CN application 201310005898.X (CN 103974315) with translation from Global Dossier.
The Second Office Action dated Aug. 14, 2017 in CN application 201310005898.X (CN 103974315) with translation from Global Dossier.
The Third Office Action dated Sep. 1, 2017in CN application 201310005898.X (CN 103974315) with translation from Global Dossier.
First Office Action from CN app. No. 201610136905.0, dated Apr. 3, 2019, with English translation from Global Dossier.
Extended European Search Report from EP app. No. 17762416.0, dated Feb. 12, 2019.
"Discussion on non-precoded CSI-RS-based scheme for EBF/FD-MIMO", 3GPP TSG RAN WG1 Meeting #81, Fukuoka, Japan, May 25-29, 2015.
"NZP CSI-RS for 12 and 16 ports", 3GPP TSG RAN WG1 Meeting #82bis, Malmo, Sweden, Oct. 9-5, 2015.
"Details on non-precoded CSI-RS design for Class a FD-MIMO", 3GPP TSG RAN WG1 Meeting #83, Anaheim, USA, Nov. 15-22, 2015.
Notice of Reasons for Refusal for JP app. No. 2018547923, dated Sep. 3, 2019, with English translation from Global Dossier.
"Transmission of non-precoded CSI-RS", R1-154300, 3GPP TSG RAN WG1 Meeting #82, Beijing, China, Aug. 24-28, 2015.
"Proposals for CSI-RS with OCC=4", R1-156679, 3GPP TSG RAN WG1 Meeting #83, Anaheim, USA, Nov. 15-22, 2015.
"CSI-RS RE mapping with CDM-4 for class A CSI reporting", R1-156783, 3GPP TSG RAN WG1 Meeting #83, Anaheim, CA, USA, Nov. 16-20, 2015.

\* cited by examiner

REFERENCE SIGNAL MAPPING METHOD AND DEVICE

CROSS-REFERENCE TO RELATED APPLICATIONS

The present application is the U.S. national phase of PCT Application No. PCT/CN2017/073077 filed on Feb. 8, 2017, which claims priority to the Chinese patent application No. 201610136905.0 filed on Mar. 10, 2016, which are incorporated herein by reference in their entireties.

TECHNICAL FIELD

The present disclosure relates to the field of wireless communication technology, in particular to a reference signal mapping method and a reference signal mapping device.

BACKGROUND

In a Long Term Evolution (LTE) Release 10 (Rel-10) system, various reference signals have been defined for downlink transmission, which mainly include Cell-specific Reference Signal (CRS), User Equipment (UE)-specific Reference Signal (UE-RS, also called as Demodulation-Reference Signal (DM-RS)) and Channel State Indication Reference Signal (CSI-RS). The CSI-RS is used to measure and estimate a downlink channel.

FIGS. 1a, 1b and 1c each shows a reference signal pattern of CSI-RS supporting by the LTE system. These reference signal patterns show resource positions of different reference signals, i.e., the positions of Resource Elements (REs) to which the different reference signals are mapped in a Physical Resource Block (PRB).

One reference signal is transmitted via each downlink antenna port, and 2-port, 4-port or 8-port CSI-RS may be configured. One PRB includes 20 groups of 2-port CSI-RS (as shown in FIG. 1a, each group of 2-port CSI-RS are mapped to a set of REs marked as 0 and 1), or 10 groups of 4-port CSI-RS (as shown in FIG. 1b, each group of 4-port CSI-RS are mapped to a set of REs marked as 0 to 3), or 5 groups of 8-port CSI-RS (as shown in FIG. 1c, each group of 8-port CSI-RS are mapped to a set of REs marked as 0 to 7). A numeral in each box in FIGS. 1a, 1b and 1c represents a port number. Every two ports are multiplexed in a code division manner on two adjacent REs. For example, in FIG. 1a, ports 0 and 1 are multiplexed on the set of REs marked as 0 and 1, in the form of (1, 1) and (1, −1). This multiplexing mode is represented as 2-bit Orthogonal Cover Code (OCC), i.e., OCC=2.

Based on the above, 12-port CSI-RS and 16-port CSI-RS have been introduced into Rel-13. The 12-port CSI-RS and the 16-port CSI-RS are both generated through port aggregation. In addition, in order to improve the power utilization, on the basis of OCC=2 in Rel-10, OCC=4 has also been introduced into Rel-13. In this regard, the 12-port CSI-RS is acquired through the aggregation of three groups of 4-port CSI-RS (OCC=2 or OCC=4). As shown in FIG. 2a, three groups of 4-port CSI-RS marked as A, B and C are aggregated into 12-port CSI-RS. 16-port CSI-RS are acquired through the aggregation of two groups of 8-port CSI-RS (OCC=2 or OCC=4). As shown in FIG. 2b, 8-port CSI-RS marked as A and B, and 8-port CSI-RS marked as C and D are aggregated into the 16-port CSI-RS. In FIGS. 2a and 2b, CSI-RSs marked as a same letter form one sub-group of OCC=4, and a Time Division Multiplexing (TDM) mode in conjunction with a Frequency Division Multiplexing (FDM) mode is adopted by each sub-group. Each group of 4-port CSI-RS are multiplexed on the four REs in each sub-group.

However, currently it is impossible for the LTE system to support transmission of the more-than-8-port CSI-RS, e.g., 16-port CSI-RS.

SUMMARY

An object of the present disclosure is to provide a reference signal mapping method and a reference signal mapping device, so as to map a 16-or-more-port CSI-RS, thereby to transmit the 16-or-more-port CSI-RS.

The present disclosure provides in some embodiments a reference signal mapping method, including:

determining REs to which a CSI-RS is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8; and performing resource mapping on the CSI-RS in accordance with the determined REs.

In a possible embodiment of the present disclosure, N is 18, 20, 24, 28 or 32. In the case that N is 24 or 32, M is 4 or 8, and in the case that N is 18, 20 or 28, M is 8.

In a possible embodiment of the present disclosure, in the case that N is 24 or 32, the RE positions to which the N-port CSI-RS in the N-port reference signal pattern are mapped are the same as RE positions to which Q groups of 4-port CSI-RS in the 4-port reference signal pattern are mapped, and each of the Q groups of 4-port CSI-RS are multiplexed using four code words of a 4-bit Orthogonal Cover Code (OCC), wherein $$Q = \frac{N}{4}.$$

In a possible embodiment of the present disclosure, in the case that N is 18, 20, 24, 28 or 32, the RE positions to which the N-port CSI-RS in the N-port reference signal pattern are mapped are the same as RE positions to which L groups of 8-port CSI-RS in the 8-port reference signal pattern are mapped, where in the case that N is 18 or 24, L is 3, and in the case that N is 20, 28 or 32, L is 4, and every S ports of the N-port CSI-RS are multiplexed using S code words in 8 code words of an 8-bit OCC, and are mapped to RE positions occupied by the 8-port CSI-RS, where S is 6 or 8 in the case that N is 18, S is 5 or 8 in the case that N is 20, S is 7 or 8 in the case that N is 28, S is 8 in the case that N is 24, and S is 8 in the case that N is 32; or every K ports of the N-port CSI-RS are multiplexed using a K-bit OCC, and are mapped to K RE positions of the RE positions occupied by the 8-port CSI-RS, where K is 6 in the case that N is 18, K is 5 in the case that N is 20, and K is 7 in the case that N is 28; or each of the L groups of 8-port CSI-RS of the N-port CSI-RS are divided into two sub-groups of CSI-RS, each of the two sub-groups of CSI-RS are multiplexed using 4 code words of a 4-bit OCC, and one of the two sub-groups of CSI-RS are mapped to RE positions corresponding to the 4-port CSI-RS, where N is 24 or 32.

In a possible embodiment of the present disclosure, the RE positions to which the N-port CSI-RS in the N-port reference signal pattern are mapped are the same as L*P RE positions to which L groups of the 8-port CSI-RS in the 8-port reference signal pattern are mapped, where P is 6 or 8 in the case that N is 18, P is 5 or 8 in the case that N is 20, P is 7 or 8 in the case that N is 28, P is 8 in the case that N is 24, and P is 8 in the case that N is 32.

In a possible embodiment of the present disclosure, in a normal Cyclic Prefix (CP) sub-frame including 14 Orthogonal Frequency Division Multiplexing (OFDM) symbols or a Downlink Pilot Time Slot (DwPTS) including 11 or 12 OFDM symbols, in the case that M is 4, the 4-port reference signal pattern includes 10 groups of 4-port CSI-RS. Each of 4 groups of the 10 groups of 4-port CSI-RS are mapped to 4 REs on the first to fourth OFDM symbols in a time division multiplexing mode, and each of the remaining 6 groups of 4-port CSI-RS are mapped to 4 REs on the fifth and sixth OFDM symbols in the time division multiplexing mode in conjunction with a frequency division multiplexing mode. The first to fourth OFDM symbols are symbols where DeModulation Reference Signals (DMRSs) are located.

In a possible embodiment of the present disclosure, in a normal CP sub-frame including 14 OFDM symbols or a DwPTS including 11 or 12 OFDM symbols, in the case that M is 8, the 8-port reference signal pattern includes 5 groups of 8-port CSI-RS, and each of the 5 groups of 8-port CSI-RS include two sub-groups of CSI-RS, each of the two sub-groups of CSI-RS are multiplexed using 4 code words of a 4-bit OCC, one of the two sub-groups of CSI-RS are mapped to 4 REs on the first to fourth OFDM symbols in a time division multiplexing mode, and the other one of the two sub-groups of CSI-RS are mapped to 4 REs on the fifth and sixth OFDM symbols in the time division multiplexing mode in conjunction with a frequency division multiplexing mode, where the first to fourth OFDM symbols are symbols where DMRSs are located; or each of the 5 groups of 8-port CSI-RS are mapped to 4 REs on the first to fourth OFDM symbols and 4 REs on the fifth and sixth OFDM symbols in the time division multiplexing mode in conjunction with the frequency division multiplexing mode, where the first to fourth OFDM symbols are symbols where DMRSs are located.

In a possible embodiment of the present disclosure, in the normal CP sub-frame including 14 OFDM symbols, the first to fourth OFDM symbols are: the sixth and seventh OFDM symbols in a first time slot of the sub-frame, and the sixth and seventh OFDM symbols in a second time slot of the sub-frame, and where the fifth and sixth OFDM symbols are the third and fourth OFDM symbols in the second time slot of the sub-frame; or in the DwPTS including 11 or 12 OFDM symbols, the first to fourth OFDM symbols are: the third and fourth OFDM symbols in a first time slot of the sub-frame, and the third and fourth OFDM symbols in a second time slot of the sub-frame, and where the fifth and sixth OFDM symbols are the sixth and seventh OFDM symbols in the first time slot of the sub-frame.

In a possible embodiment of the present disclosure, in 12 OFDM symbols of an extended CP sub-frame, each of the plurality of groups of M-port CSI-RS in the M-port reference signal pattern are mapped to the fifth and sixth OFDM symbols in a first time slot of the sub-frame and the fifth and sixth OFDM symbols in a second time slot of the sub-frame in a time division multiplexing mode in conjunction with a frequency division multiplexing mode.

The present disclosure further provides in some embodiments a reference signal mapping device. The device includes:

a determination module configured to determine Resource Elements (REs) to which a Channel State Indication Reference Signal (CSI-RS) is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8; and a mapping module configured to perform resource mapping on the CSI-RS in accordance with the determined REs.

In a possible embodiment of the present disclosure, N is 18, 20, 24, 28 or 32. In the case that N is 24 or 32, M is 4 or 8, and in the case that N is 18, 20 or 28, M is 8.

In a possible embodiment of the present disclosure, in the case that N is 24 or 32, the RE positions to which the N-port CSI-RS in the N-port reference signal pattern are mapped are the same as RE positions to which Q groups of 4-port CSI-RS in the 4-port reference signal pattern are mapped, and each of the Q groups of the 4-port CSI-RS are multiplexed using four code words of a 4-bit Orthogonal Cover Code (OCC), wherein $$Q = \frac{N}{4}.$$

In a possible embodiment of the present disclosure, in the case that N is 18, 20, 24, 28 or 32, the RE positions to which the N-port CSI-RS in the N-port reference signal pattern are mapped are the same as RE positions to which L groups of 8-port CSI-RS in the 8-port reference signal pattern are mapped, where in the case that N is 18 or 24, L is 3, and in the case that N is 20, 28 or 32, L is 4, and every S ports of the N-port CSI-RS are multiplexed using S code words in 8 code words of an 8-bit OCC, and are mapped to RE positions occupied by the 8-port CSI-RS, where S is 6 or 8 in the case that N is 18, S is 5 or 8 in the case that N is 20, S is 7 or 8 in the case that N is 28, S is 8 in the case that N is 24, and S is 8 in the case that N is 32; or every K ports of the N-port CSI-RS are multiplexed using a K-bit OCC, and are mapped to K RE positions of the RE positions occupied by the 8-port CSI-RS, where K is 6 in the case that N is 18, K is 5 in the case that N is 20, and K is 7 in the case that N is 28; or each of the L groups of 8-port CSI-RS of the N-port CSI-RS are divided into two sub-groups of CSI-RS, each of the two sub-groups of CSI-RS are multiplexed using 4 code words of a 4-bit OCC, and one of the two sub-groups of CSI-RS are mapped to RE positions corresponding to the 4-port CSI-RS, where N is 24 or 32.

In a possible embodiment of the present disclosure, the RE positions to which the N-port CSI-RS in the N-port reference signal pattern are mapped are the same as L*P RE positions to which L groups of the 8-port CSI-RS in the 8-port reference signal pattern are mapped, where P is 6 or 8 in the case that N is 18, P is 5 or 8 in the case that N is 20, P is 7 or 8 in the case that N is 28, P is 8 in the case that N is 24, and P is 8 in the case that N is 32.

In a possible embodiment of the present disclosure, in a normal Cyclic Prefix (CP) sub-frame including 14 Orthogonal Frequency Division Multiplexing (OFDM) symbols or a Downlink Pilot Time Slot (DwPTS) including 11 or 12 OFDM symbols, in the case that M is 4, the 4-port reference signal pattern includes 10 groups of 4-port CSI-RS. Each of 4 groups of the 10 groups of 4-port CSI-RS are mapped to 4 REs on the first to fourth OFDM symbols in a time division multiplexing mode, and each of the remaining 6 groups of 4-port CSI-RS are mapped to 4 REs on the fifth and sixth OFDM symbols in the time division multiplexing mode in conjunction with a frequency division multiplexing mode. The first to fourth OFDM symbols are symbols where DeModulation Reference Signals (DMRSs) are located.

In a possible embodiment of the present disclosure, where in a normal CP sub-frame including 14 OFDM symbols or a DwPTS including 11 or 12 OFDM symbols, in the case that M is 8, the 8-port reference signal pattern includes 5 groups of 8-port CSI-RS, and each of the 5 groups of 8-port CSI-RS include two sub-groups of CSI-RS, each of the two sub-groups of CSI-RS are multiplexed using 4 code words of a 4-bit OCC, one of the two sub-groups of CSI-RS are mapped to 4 REs on the first to fourth OFDM symbols in a time division multiplexing mode, and the other one of the two sub-groups of CSI-RS are mapped to 4 REs on the fifth and sixth OFDM symbols in the time division multiplexing mode in conjunction with a frequency division multiplexing mode, where the first to fourth OFDM symbols are symbols where DMRSs are located; or each of the 5 groups of 8-port CSI-RS are mapped to 4 REs on the first to fourth OFDM symbols and 4 REs on the fifth and sixth OFDM symbols in the time division multiplexing mode in conjunction with the frequency division multiplexing mode, where the first to fourth OFDM symbols are symbols where DMRSs are located.

In a possible embodiment of the present disclosure, in the normal CP sub-frame including 14 OFDM symbols, the first to fourth OFDM symbols are: the sixth and seventh OFDM symbols in a first time slot of the sub-frame, and the sixth and seventh OFDM symbols in a second time slot of the sub-frame, and where the fifth and sixth OFDM symbols are the third and fourth OFDM symbols in the second time slot of the sub-frame; or in the DwPTS including 11 or 12 OFDM symbols, the first to fourth OFDM symbols are: the third and fourth OFDM symbols in a first time slot of the sub-frame, and the third and fourth OFDM symbols in a second time slot of the sub-frame, and where the fifth and sixth OFDM symbols are the sixth and seventh OFDM symbols in the first time slot of the sub-frame.

In a possible embodiment of the present disclosure, in 12 OFDM symbols of an extended CP sub-frame, each of the plurality of groups of M-port CSI-RS in the M-port reference signal pattern are mapped to the fifth and sixth OFDM symbols in a first time slot of the sub-frame and the fifth and sixth OFDM symbols in a second time slot of the sub-frame in a time division multiplexing mode in conjunction with a frequency division multiplexing mode.

The present disclosure further provides in some embodiments a reference signal mapping device. The device includes a processor and a memory. The processor is configured to read a program stored in the memory, so as to:

determine Resource Elements (REs) to which a Channel State Indication Reference Signal (CSI-RS) is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8; and perform resource mapping on the CSI-RS in accordance with the determined REs, and where the memory is configured to store therein data used by the processor in performing operations.

The present disclosure further provides in some embodiments a base station, including a processor, a memory, a transceiver and a bus interface. The processor is configured to read a program stored in the memory, so as to:

determine Resource Elements (REs) to which a Channel State Indication Reference Signal (CSI-RS) is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8; and perform resource mapping on the CSI-RS in accordance with the determined REs.

According to the embodiments of the present disclosure, the N-port reference signal pattern is acquired in accordance with the 4-port or 8-port reference signal pattern. In the case of mapping the reference signal, the REs to which the CSI-RS is mapped are determined in accordance with the N-port reference signal pattern, and then the resource mapping operation is performed in accordance with the determined REs. N is an integer greater than 16, so it is able to map more-than-16-port CSI-RS to the REs, thereby to transmit the more-than-16-port CSI-RS.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Currently, transmission of 1-port, 2-port, 4-port, 8-port, 12-port and 16-port CSI-RS are supported by an LTE system, but transmission of more-than-16-port CSI-RS, e.g., 18-port, 20-port, 24-port, 28-port or 32-port CSI-RS, are not supported by the LTE system. In view of the above problem, embodiments of the present disclosure provide a reference signal mapping method and a reference signal mapping device capable of supporting the transmission of more-than-16-port CSI-RS.

The present disclosure will be described hereinafter in conjunction with the drawings and embodiments.

Each reference signal is transmitted via one downlink antenna port. Each antenna port refers to a logic port for transmission, and it may correspond to one or more actual physical antennae. The antenna port is defined from perspective of a receiver. In other words, in the case that the receiver needs to differentiate resources from each other in space, it is necessary to define a plurality of antenna ports. For a terminal, a corresponding antenna port is just defined by a reference signal received thereby, although the reference signal is probably acquired by combining a plurality of signals transmitted via the plurality of physical antennae.

Figure 3:
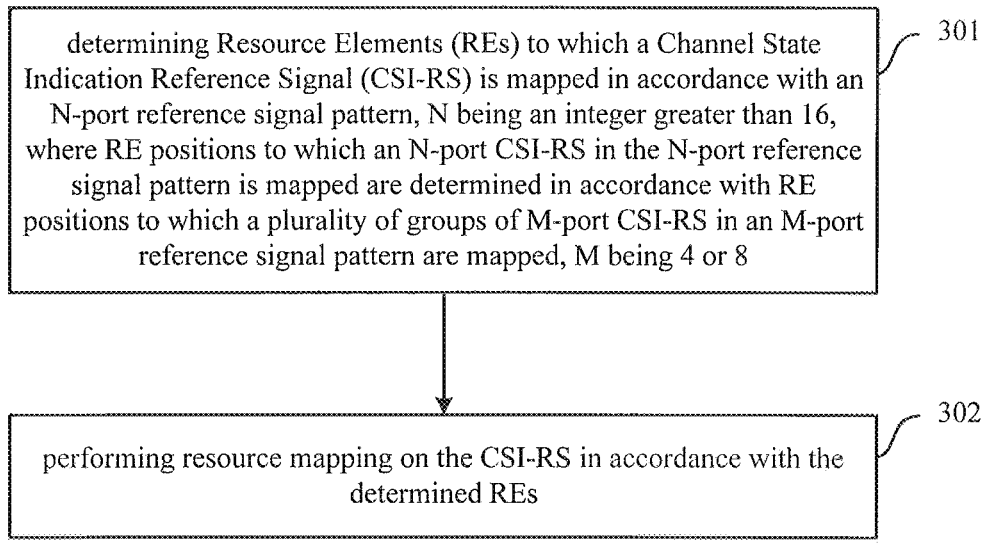
FIG. 3 is a flow chart of a reference signal mapping method according to embodiments of the present disclosure.

As shown in FIG. 3, the present disclosure provides in some embodiments a reference signal mapping method, which may be executed by a base station. The method includes:

step 301 of determining Resource Elements (REs) to which a Channel State Indication Reference Signal (CSI-RS) is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8; and step 302 of performing resource mapping on the CSI-RS in accordance with the determined REs.

In a possible embodiment of the present disclosure, N is 18, 20, 24, 28 or 32. In the case that N is 24 or 32, M is 4 or 8, and in the case that N is 18, 20 or 28, M is 8.

Through the above-mentioned steps, in the case that a base station has N antenna ports, the base station may configure an N-port CSI-RS for a terminal. The terminal may measure a channel on a configured CSI-RS port and return channel information to the base station.

According to the embodiments of the present disclosure, the N-port (N=18, 20, 24, 28 or 32) reference signal pattern is acquired in accordance with a 4-port or 8-port reference signal pattern. In the case of mapping the reference signal, the RE position to which the CSI-RS is mapped is determined in accordance with the N-port reference signal pattern, and then the resource mapping is performed on the CSI-RS in accordance with the RE position. As a result, it is able to map the N-port CSI-RS, thereby to transmit the N-port CSI-RS.

The following description will be given by taking N=18, 20, 24, 28 or 32 as an example. Based on the above steps, in the case of determining the RE positions to which the N-port CSI-RS is mapped in accordance with the 4-port reference signal pattern, there may exist the following situations.

Situation 1-1: with respect to the mapping or transmission of 24-port CSI-RS, RE positions to which the 24-port CSI-RS in a 24-port reference signal pattern is mapped are the same as RE positions to which 6 groups of 4-port CSI-RS in the 4-port reference signal pattern are mapped, and each of the 6 groups of 4-port CSI-RS are multiplexed using 4 code words of a 4-bit OCC (i.e., OCC=4). Each of the 6 groups of 4-port CSI-RS are mapped to 4 REs.

Situation 1-2: with respect to the mapping or transmission of a 32-port CSI-RS, RE positions to which the 32-port CSI-RS in a 32-port reference signal pattern is mapped are the same as RE positions to which 8 groups of 4-port CSI-RS in the 4-port reference signal pattern are mapped, and each of the 8 groups of 4-port CSI-RS are multiplexed using 4 code words of a 4-bit OCC (i.e., OCC=4). Each of the 8 groups of 4-port CSI-RS are mapped to 4 REs.

In the above Situation 1-1 or 1-2, the symbol positions of the REs to which the CSI-RS in the 4-port reference signal pattern is mapped vary with the quantity of symbols included in one sub-frame.

To be specific, in a normal Cyclic Prefix (CP) sub-frame including 14 OFDM symbols or a DwPTS including 11 or 12 OFDM symbols, the 4-port reference signal pattern includes 10 groups of 4-port CSI-RS. Each of 4 groups of the 10 groups of 4-port CSI-RS are mapped to 4 REs on first to fourth OFDM symbols in a time division multiplexing mode, and each of the remaining 6 groups of 4-port CSI-RS are mapped to 4 REs on fifth and sixth OFDMs in the time division multiplexing mode in conjunction with a frequency division multiplexing mode. The first to fourth OFDM symbols are symbols where DMRSs are located.

In a normal cyclic sub-frame (e.g., the normal CP sub-frame) including 14 OFDM symbols, the first to fourth OFDM symbols are sixth and seventh OFDM symbols in the first time slot of one sub-frame (i.e., OFDM symbols 5 and 6 in slot 0) and sixth and seventh OFDM symbols in the second time slot of the sub-frame (i.e., OFDM symbols 5 and 6 in slot 1). The fifth and sixth OFDM symbols are third and fourth OFDM symbols in the second time slot of the sub-frame (i.e., OFDM symbols 2 and 3 in slot 1).

In the DwPTS including 11 or 12 OFDM symbols, the first to fourth OFDM symbols are third and fourth OFDM symbols in the first time slot of one sub-frame (i.e., OFDM symbols 2 and 3 in slot 0) and third and fourth OFDM symbols in the second time slot of the sub-frame (i.e., OFDM symbols 2 and 3 in slot 1). The fifth and sixth OFDM symbols are sixth and seventh OFDM symbols in the first time slot of the sub-frame (i.e., OFDM symbols 5 and 6 in slot 0).

In the case that one sub-frame includes 12 OFDM symbols (e.g., an extended CP sub-frame), each group of 4-port CSI-RS in the 4-port reference signal pattern used in the above Situations 1-1 and 1-2 may be mapped to fifth and sixth OFDM symbols in the first time slot of one sub-frame (i.e., OFDM symbols 4 and 5 in slot 0) and fifth and sixth OFDM symbols in the second time slot of the sub-frame (i.e., OFDM symbols 4 and 5 in slot 1) in the time division multiplexing mode in conjunction with the frequency division multiplexing mode.

Based on the above description in the embodiments of the present application, the 4-port reference signal pattern is re-defined as a basis for determining the N-port reference signal pattern. For example, in the case that one sub-frame includes 14 OFDM symbols, in the re-defined 4-port reference signal pattern, 4 groups of 4-port CSI-RS may occupy 4 OFDM symbols respectively, and may be mapped to OFDM symbols 5 and 6 in the first time slot of the sub-frame and OFDM symbols 5 and 6 in the second time slot of the sub-frame in the time division multiplexing mode. The remaining 4 groups of 4-port CSI-RS may occupy 2 OFDM symbols respectively, and may be mapped to OFDM symbols 2 and 3 in the second time slot of the sub-frame in the time division multiplexing mode in conjunction with the frequency division multiplexing mode.

Based on the above, in the case of determining the RE positions to which the N-port CSI-RS are mapped in accordance with the 8-port reference signal pattern, there may exist the following situations.

Situation 2-1: with respect to the mapping or transmission of 18-port CSI-RS, RE positions to which the 18-port CSI-RS in a 18-port reference signal pattern is mapped are the same as RE positions to which 3 groups of 8-port CSI-RS in the 8-port reference signal pattern are mapped, and each group of 6 ports for the 18-port CSI-RS are multiplexed using 6 code words of 8 code words of a 8-bit OCC (i.e., OCC=8). Each group of 6-port CSI-RS are mapped to 8 REs.

In an alternative solution to Situation 2-1, the RE positions to which the 18-port CSI-RS is mapped are the same as 18 RE positions to which 3 groups of 8-port CSI-RS in the 8-port reference signal pattern are mapped, and each group of 6 ports for the 18-port CSI-RS are multiplexed using a 6-bit OCC (i.e., OCC=6). Each group of 6-port CSI-RS are mapped to 6 REs.

Situation 2-2: with respect to the mapping or transmission of a 20-port CSI-RS, RE positions to which the 20-port CSI-RS in a 20-port reference signal pattern is mapped are the same as REs to which 4 groups of 8-port CSI-RS in the 8-port reference signal pattern are mapped, and each group of 5 ports for the 20-port CSI-RS are multiplexed using 5 code words of the 8 code words of the 8-bit OCC (i.e., OCC=8). Each group of 5-port CSI-RS are mapped to 8 REs.

In an alternative solution to Situation 2-2, the RE positions to which the 20-port CSI-RS are mapped are the same as 20 RE positions to which 4 groups of 8-port CSI-RS in the 8-port reference signal pattern are mapped, and each group of 5 ports for the 20-port CSI-RS are multiplexed using a 5-bit OCC (i.e., OCC=5). Each group of 5-port CSI-RS are mapped to 5 REs.

Situation 2-3: with respect to the mapping or transmission of a 24-port CSI-RS, RE positions to which the 24-port CSI-RS in a 24-port reference signal pattern is mapped are the same as RE positions to which 3 groups of 8-port CSI-RS in the 8-port reference signal pattern are mapped. Each group of 8-port CSI-RS may be multiplexed using the 8 code words of the 8-bit OCC (i.e., OCC=8), or each of two sub-groups of each group of 8-port CSI-RS may be multiplexed using the 4 code words of the 4-bit OCC (i.e., OCC=4). One sub-group of 8-port CSI-RS are mapped to REs corresponding to 4 ports. Each group of 8-port CSI-RS are mapped to 8 REs.

Situation 2-4: with respect to the mapping or transmission of a 28-port CSI-RS, RE positions to which the 28-port CSI-RS in a 28-port reference signal pattern is mapped are the same as RE positions to which 4 groups of 8-port CSI-RS in the 8-port reference signal pattern are mapped, and each group of 7 ports for the 28-port CSI-RS are multiplexed using 7 code words of the 8 code words of the 8-bit OCC (i.e., OCC=8). Each group of 7-port CSI-RS are mapped to 8 REs.

In an alternative solution to Situation 2-4, the RE positions to which the 28-port CSI-RS is mapped are the same as 28 RE positions to which 4 groups of 8-port CSI-RS in the 8-port reference signal pattern are mapped, and each group of 7 ports for the 28-port CSI-RS are multiplexed using a 7-bit OCC (i.e., OCC=7). Each group of 7-port CSI-RS are mapped to 7 REs.

Situation 2-5: with respect to the mapping or transmission of a 32-port CSI-RS, RE positions to which the 32-port CSI-RS in a 32-port reference signal pattern is mapped are the same as RE positions to which 4 groups of 8-port CSI-RS in the 8-port reference signal pattern are mapped. Each group of 8-port CSI-RS may be multiplexed using the 8 code words of the 8-bit OCC (i.e., OCC=8), or each of two sub-groups of each group of 8-port CSI-RS may be multiplexed using the 4 code words of the 4-bit OCC (i.e., OCC=4). One sub-group of 8-port CSI-RS are mapped to REs corresponding to 4 ports. Each group of 8-port CSI-RS are mapped to 8 REs.

In the above Situations 2-1 or 2-5, the symbol position of the RE to which the CSI-RS in the 8-port reference signal pattern is mapped varies with the quantity of symbols included in one sub-frame.

To be specific, in the case that one sub-frame includes 14 or 11 OFDM symbols, and the 8-port reference signal pattern includes 5 groups of 8-port CSI-RS.

In a possible embodiment of the present disclosure, each group of 8-port CSI-RS include two sub-groups of CSI-RS, and each sub-group of CSI-RS are multiplexed using the 4 code words of the 4-bit OCC. One sub-group of CSI-RS are mapped to 4 REs on first to fourth OFDM symbols in the time division multiplexing mode, and the other sub-group are mapped to 4 REs on fifth and sixth OFDM symbols in the time division multiplexing mode in conjunction with the frequency division multiplexing mode. The first to fourth OFDM symbols are symbols where the DMRSs are located.

In another possible embodiment of the present disclosure, each group of 8-port CSI-RS are multiplexed using the 8-bit OCC. The 8-port CSI-RS is mapped to 4 REs on the first to fourth OFDM symbols and 4 REs on the fifth and sixth OFDM symbols in the time division multiplexing mode in conjunction with the frequency division multiplexing mode. The first to fourth OFDM symbols are symbols where the DMRSs are located.

In the normal CP sub-frame including 14 OFDM symbols, the first to fourth OFDM symbols are sixth and seventh OFDM symbols in the first time slot of one sub-frame (i.e., OFDM symbols 5 and 6 in slot 0) and sixth and seventh OFDM symbols in the second time slot of the sub-frame (i.e., OFDM symbols 5 and 6 in slot 1), and the fifth and sixth OFDM symbols are third and fourth OFDM symbols in the second time slot of the sub-frame (i.e., OFDM symbols 2 and 3 in slot 1).

In the DwPTS including 11 or 12 OFDM symbols, the first to fourth OFDM symbols are third and fourth OFDM symbols in the first time slot of one sub-frame (i.e., OFDM symbols 2 and 3 in slot 0) and third and fourth OFDM symbols in the second time slot of the sub-frame (i.e., OFDM symbols 2 and 3 in slot 1), and the fifth and sixth OFDM symbols are sixth and seventh OFDM symbols in the first time slot of the sub-frame (i.e., OFDM symbols 5 and 6 in slot 0).

In the extended CP sub-frame including 12 OFDM symbols, each group of 8-port CSI-RS in the 8-port reference signal pattern used in the above Situations 2-1 and 2-5 may be mapped to fifth and sixth OFDM symbols in the first time slot of one sub-frame (i.e., OFDM symbols 4 and 5 in slot 0) and fifth and sixth OFDM symbols in the second time slot of the sub-frame (i.e., OFDM symbols 4 and 5 in slot 1) in the time division multiplexing mode in conjunction with the frequency division multiplexing mode.

Based on the above description in the embodiments of the present application, the 8-port reference signal pattern is re-defined as a basis for determining the N-port reference signal pattern. For example, in the case that one sub-frame includes 14 OFDM symbols, in the re-defined 8-port reference signal pattern, each group of 8-port CSI-RS may occupy 6 OFDM symbols. 4 ports may be mapped to OFDM symbols 5 and 6 in the first time slot of the sub-frame and OFDM symbols 5 and 6 in the second time slot of the sub-frame in the time division multiplexing mode. The remaining 4 ports may be mapped to OFDM symbols 2 and 3 in the second time slot of the sub-frame in the time division multiplexing mode in conjunction with the frequency division multiplexing mode.

Figure 1A:
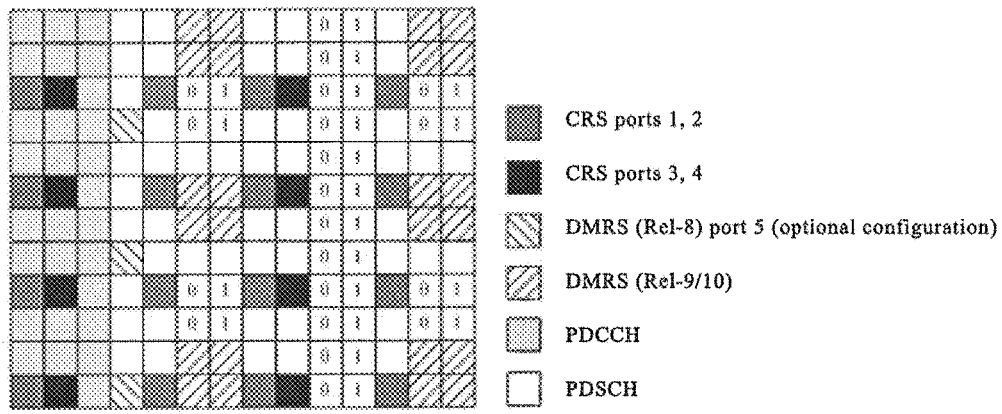
FIGS. 1a, 1b and 1c are schematic diagrams respectively showing 2-port, 4-port and 8-port reference signal patterns in the related art.
Figure 1B:
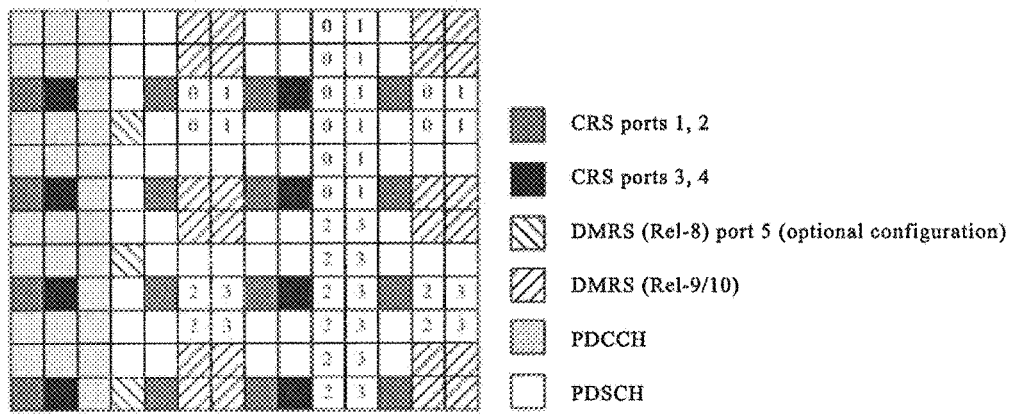
Figure 1C:
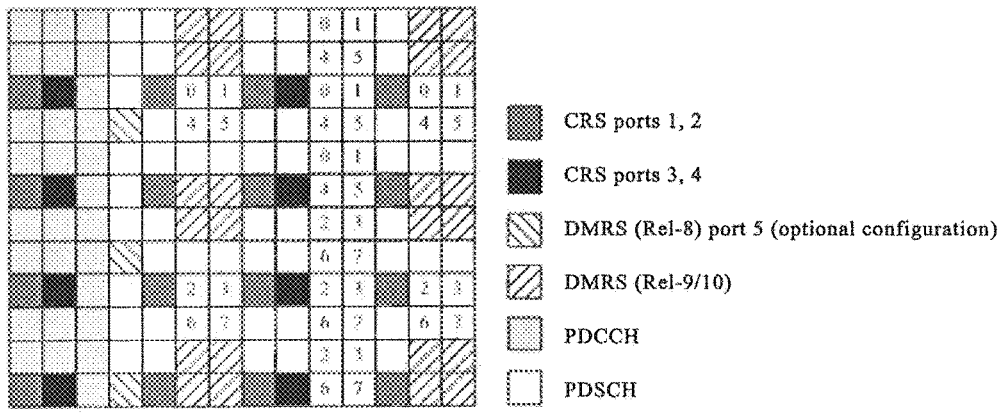
Figure 2A:
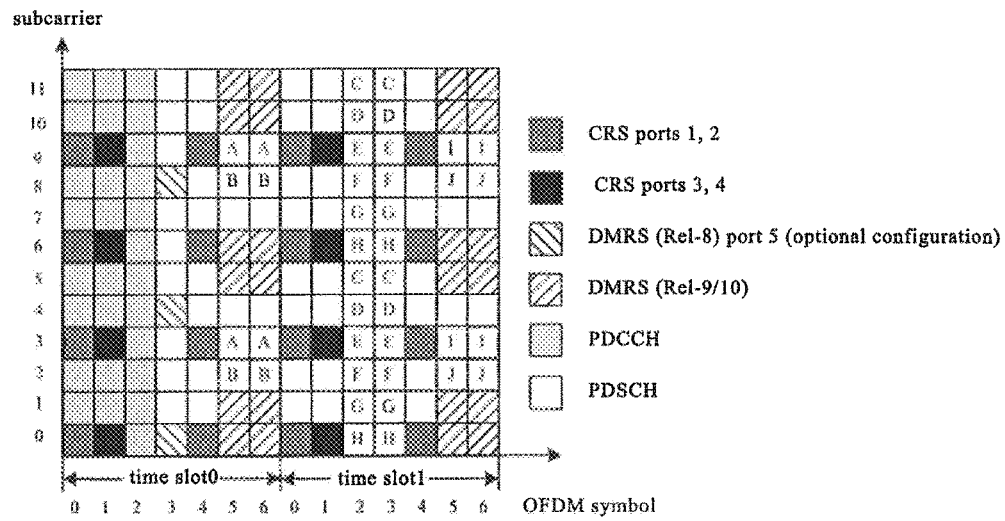
FIGS. 2a and 2b are schematic diagrams respectively showing 12-port and 16-port reference signal patterns in a conventional LTE Rel-13 system.
Figure 2B:
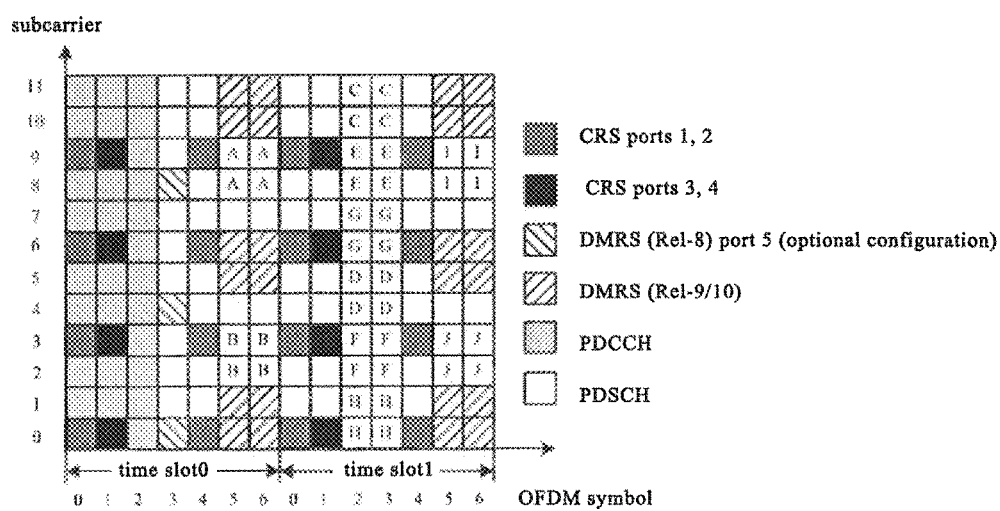

For the 32-port CSI-RS, in the case that the ports (OCC=2) in FIG. 1a, 1b or 1c (e.g., 16 groups of 2-port CSI-RS, 8 groups of 4-port CSI-RS or 4 groups of 8-port CSI-RS) are directly used for aggregation, it is impossible to fully utilize the power at each port, and a pilot power is merely one quarter of a data power. In the case that the ports (OCC=4) in FIG. 2 (e.g., 8 groups of 4-port CSI-RS or 4 groups of 8-port CSI-RS) are directly used for aggregation, the pilot power of the OFDM symbols 5 and 6 may be different from that of the OFDM symbols 2 and 3. Specifically, the pilot power of the OFDM symbols 5 and 6 is one quarter of the data power of the OFDM symbols 5 and 6, while the pilot power of the OFDM symbols 2 and 3 is a half of the data power of the OFDM symbols 2 and 3). Hence, a coverage range of a pilot may be adversely affected. Similarly, for the pilot transmitted via 18, 20, 24 or 28 ports, there also exists the above problem, i.e., different pilot power. However, according to one of the above optional schemes in the embodiment of the present disclosure, the 8-bit OCC (i.e., OCC=8) is used for the aggregation. In this way, it is able to transmit the CSI-RS at the same power and fully utilize the power of the pilot when the OCC is extended to 8, without providing any additional pilot resources or decreasing a density of the pilot.

The following description will be given by taking the 32-port CSI-RS, the 24-port CSI-RS, the 18-port CSI-RS, the 20-port CSI-RS and the 28-port CSI-RS as examples.

(1) 32-Port Reference Signal Pattern

Method 1

In Method 1, in the 32-port reference signal pattern, 32 RE positions to which one group of 32-port CSI-RS are mapped are the same as 32 RE positions to which 8 groups of 4-port CSI-RS in the 4-port reference signal pattern are mapped, and each group of 4-port CSI-RS are multiplexed using the 4-bit OCC.

One PRB may include 10 groups of 4-port CSI-RS, and any 8 groups of the 10 groups of 4-port CSI-RS may be selected to form the 32-port CSI-RS. In a possible embodiment of the present disclosure, any 4 groups of 4-port CSI-RS selected on OFDM symbols 2 and 3 in slot 1 may be combined with 4 groups of 4-port CSI-RS selected on OFDM symbols 5 and 6 in slot 0 and slot 1, so as to form the 32-port CSI-RS.

Figure 4A:
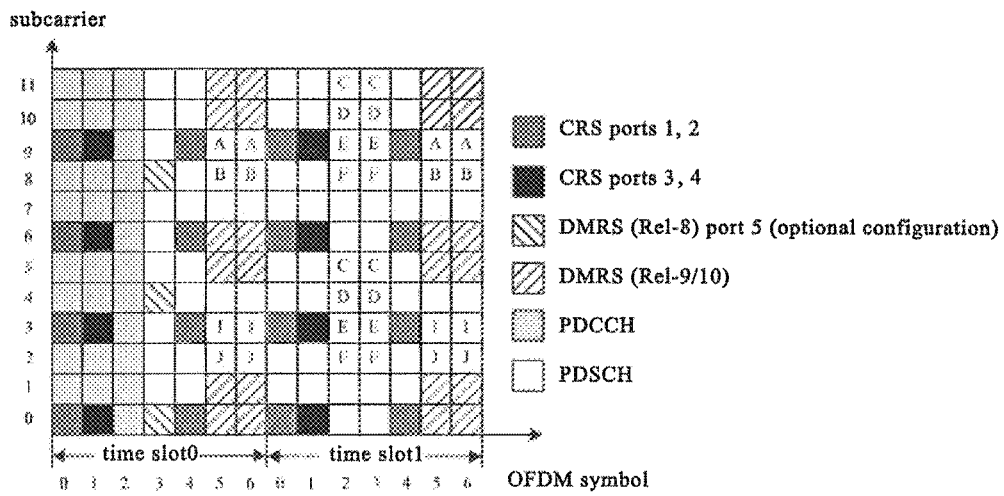
FIGS. 4a, 4b, 4c and 4d each is a schematic diagram showing a 32-port reference signal pattern for method 1 according to embodiments of the present disclosure.

FIG. 4a illustratively shows the 32-port reference signal pattern in Method 1. In FIG. 4a, each square represents one RE. The square corresponding to each of the REs to which the 32-port CSI-RS is mapped is marked with a letter, and the same letter represents the REs to which one group of 4-port CSI-RS in the 4-port reference signal pattern are mapped. The 32-port reference signal pattern in FIG. 4a includes 8 groups of 4-port CSI-RS, and the REs to which the 8 groups of 4-port CSI-RS are mapped are marked as A, B, C, D, E, F, I and J, and each group of REs are the same as the REs to which one group of 4-port CSI-RS in the 4-port reference signal pattern are mapped.

To be specific, the REs marked as A on the OFDM symbols 5 and 6 in slot 0 and the REs marked as A on the OFDM symbols 5 and 6 in slot 1 may form one sub-group in the TDM mode. Similarly, the REs marked as B, I, J on the OFDM symbols 5 and 6 in slot 0 and slot 1 may form three sub-groups. The REs marked as C on the OFDM symbols 2 and 3 in slot 1 may form one sub-group in the TDM mode in conjunction with the FDM mode. Similarly, the REs marked as D, E, F on the OFDM symbols 2 and 3 in the slot 1 may form three sub-groups.

The CSI-RS corresponding to the same letter may form a sub-group of OCC=4, and this sub-group may be multiplexed using the 4-bit OCC (i.e., OCC=4).

Figure 4B:
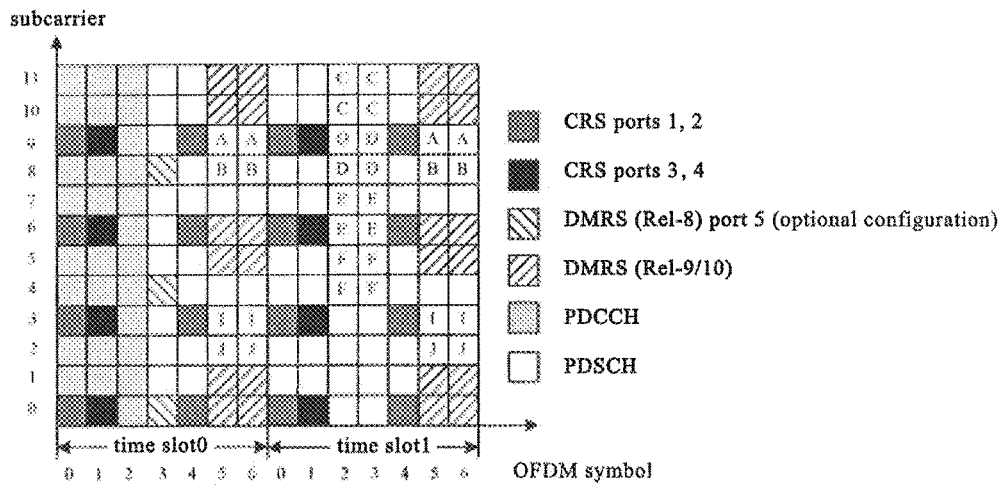

FIG. 4b illustratively shows another 32-port reference signal pattern in Method 1. FIG. 4b differs from FIG. 4a in that the CSI-RSs on the OFDM symbols 2 and 3 in slot 1 belong to different groups. In FIG. 4b, the CSI-RSs corresponding to the same letter may be multiplexed using the 4-bit OCC.

It should be appreciated that, FIGS. 4a and 4b merely show the possible 32-port reference signal pattern. Based on the above-mentioned distribution rule of the 32-port reference signal pattern, some other 32-port reference signal patterns may also be acquired, which will not be particularly defined herein.

In the embodiments of the present disclosure, based on the principle of Method 1, it is also able to acquire the 32-port reference signal pattern in a DwPTS region of a Time Division Duplexing (TDD) sub-frame.

Figure 4C:
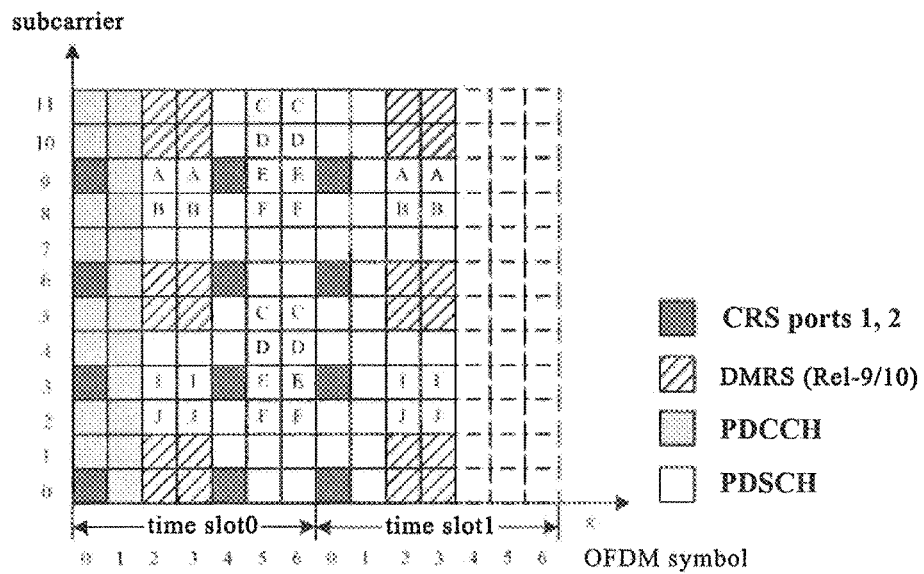
Figure 4D:
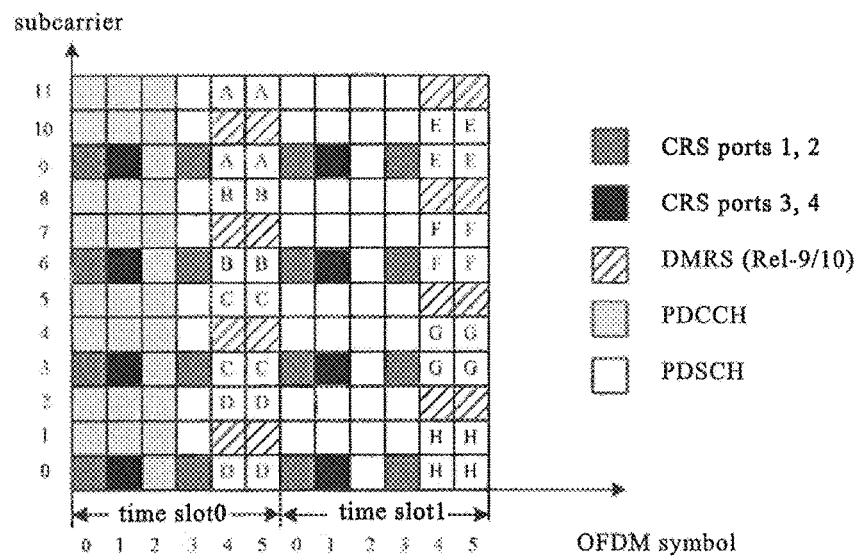

FIGS. 4c and 4d each shows another 32-port reference signal patterns. The 32-port reference signal pattern in FIG. 4c may be applied to the DwPTS including 11 or 12 OFDM symbols, while that in FIG. 4d may be applied to a sub-frame using an extended CP and having a length of 12 symbols. In FIGS. 4c and 4d, the 32-port CSI-RS includes 8 groups of 4-port CSI-RS. Each group is marked with a same letter, and the CSI-RSs with the same letter form a sub-group of OCC=4 and are multiplexed using the 4-bit OCC. It should be appreciated that, FIGS. 4c and 4d merely show two possible 32-port reference signal patterns. Based on the above-mentioned distribution rule of the 32-port reference signal pattern, some other 32-port reference signal patterns may also be acquired, which will not be particularly defined herein.

According to the 32-port CSI-RS in Method 1, the 32 CSI-RS ports may have the same transmission power, and the OCC used for these ports may be defined using a spreading code in Rel-13.

Method 2

In Method 2, in the 32-port reference signal pattern, 32 RE positions to which one group of 32-port CSI-RS are mapped are the same as 32 RE positions to which 4 groups of 8-port CSI-RS in the 8-port reference signal pattern are mapped. Two sub-groups of each group of 8-port CSI-RS are each multiplexed using the 4-bit OCC, and each sub-group of the 8-port CSI-RS is mapped to the REs corresponding to 4 ports.

One PRB may include 5 groups of 8-port CSI-RS, and in the embodiments of the present application, any 4 groups of 8-port CSI-RS may be selected to form the 32-port CSI-RS. In a possible embodiment of the present disclosure, the REs to which each group of 8-port CSI-RS are mapped may be distributed on the OFDM symbols 5, 6 in slot 0, the OFDM symbols 5, 6 in slot 1, and the OFDM symbols 2, 3 in slot 1. For each group of 8-port CSI-RS, 2 REs on the OFDM symbols 5, 6 in slot 0 and 2 REs on the OFDM symbols 5, 6 in slot 1 may form one sub-group, and 4 REs on OFDM symbols 2, 3 in slot 1 may form one sub-group.

Figure 5A:
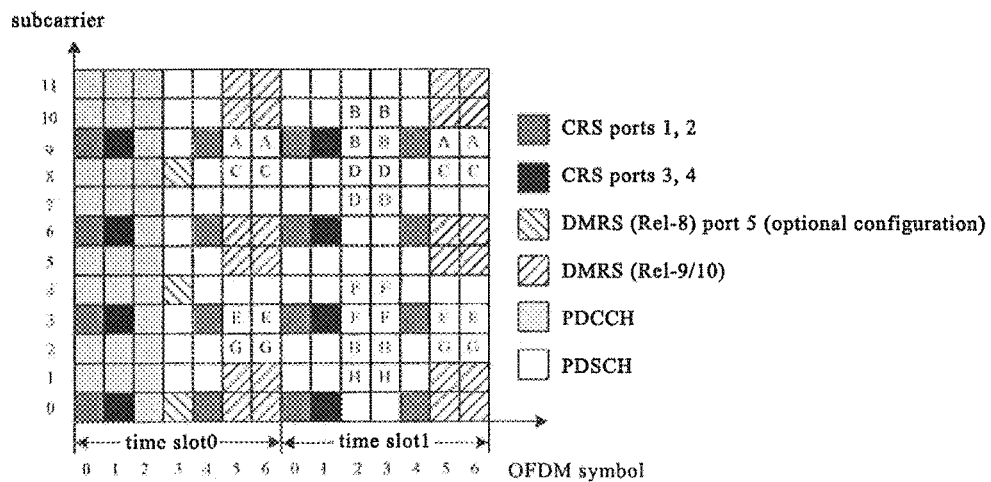
FIGS. 5a, 5b, 5c and 5d each is a schematic diagram showing the 32-port reference signal pattern for method 2 according to embodiments of the present disclosure.

FIG. 5a illustratively shows the 32-port reference signal pattern in Method 2. In FIG. 5a, each square represents one RE. The square corresponding to each of REs to which the 32-port CSI-RS are mapped is marked with a letter. The 32-port reference signal pattern in FIG. 5a includes 4 groups of 8-port CSI-RS, and the REs to which the 4 groups of 8-port CSI-RS are mapped are marked as A to H. Two groups of REs marked as A and B are the same as the REs to which one group of 8-port CSI-RS in the 8-port reference signal pattern are mapped. Identically, two groups of REs marked as C and D, two groups of REs marked as E and F, and two groups of REs marked as G and H are each the same as the REs to which one group of 8-port CSI-RS in the 8-port reference signal pattern are mapped.

To be specific, the REs marked as A on the OFDM symbols 5 and 6 in slot 0 and the REs marked as A on the OFDM symbols 5 and 6 in slot 1 may form one sub-group in the TDM mode. Similarly, the REs marked as C, E, G on the OFDM symbols 5 and 6 in slot 0 and slot 1 may form three sub-groups. The REs marked as B on the OFDM symbols 2 and 3 in slot 1 may form one sub-group in the TDM mode in conjunction with the FDM mode. Similarly, the REs marked as D, F, H on the OFDM symbols 2 and 3 in the slot 1 may form three sub-groups.

The CSI-RSs corresponding to the same letter may form a sub-group of OCC=4, and this sub-group may be multiplexed using the 4-bit OCC (i.e., OCC=4).

Figure 5B:
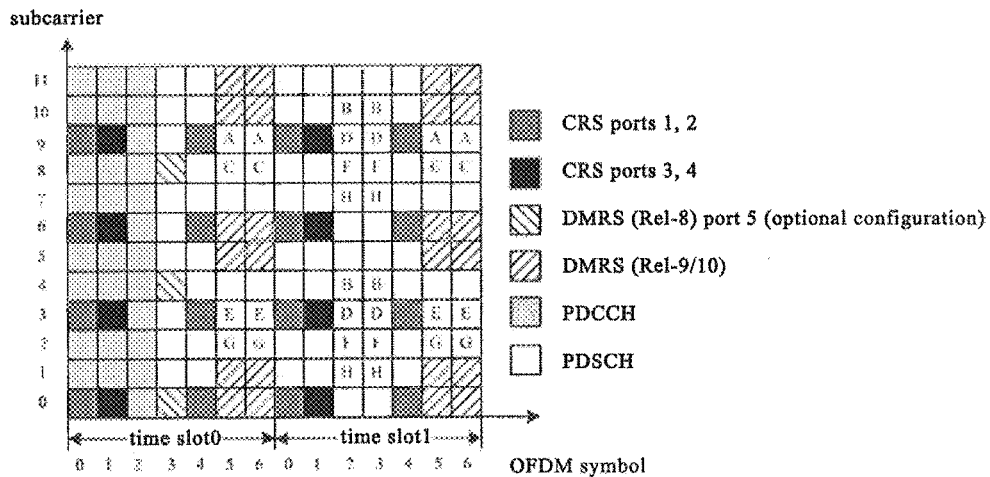

FIG. 5b illustratively shows another 32-port reference signal pattern in Method 2. FIG. 5b differs from FIG. 5a in that the CSI-RSs on the OFDM symbols 2 and 3 in slot 1 belong to different groups. In FIG. 5b, the CSI-RSs corresponding to the same letter may form a sub-group of OCC=4 and may be multiplexed using the 4-bit OCC.

It should be appreciated that, FIGS. 5a and 5b merely show the possible 32-port reference signal patterns. Based on the above-mentioned distribution rule of the 32-port reference signal pattern, the other 32-port reference signal pattern may also be acquired. For example, in FIG. 5a, the 4 sub-groups of REs (i.e., B, D, F, H) on the OFDM symbols 2, 3 and the unused REs on the OFDM symbols 2, 3 are merely for illustrative purposes, i.e., the REs of the 4 sub-groups may be located at any positions on the OFDM symbols 2, 3 in the case of not overlapping each other.

In the embodiments of the present disclosure, based on the principle of Method 2, it is also able to acquire the 32-port reference signal pattern in a DwPTS region of a TDD sub-frame.

Figure 5C:
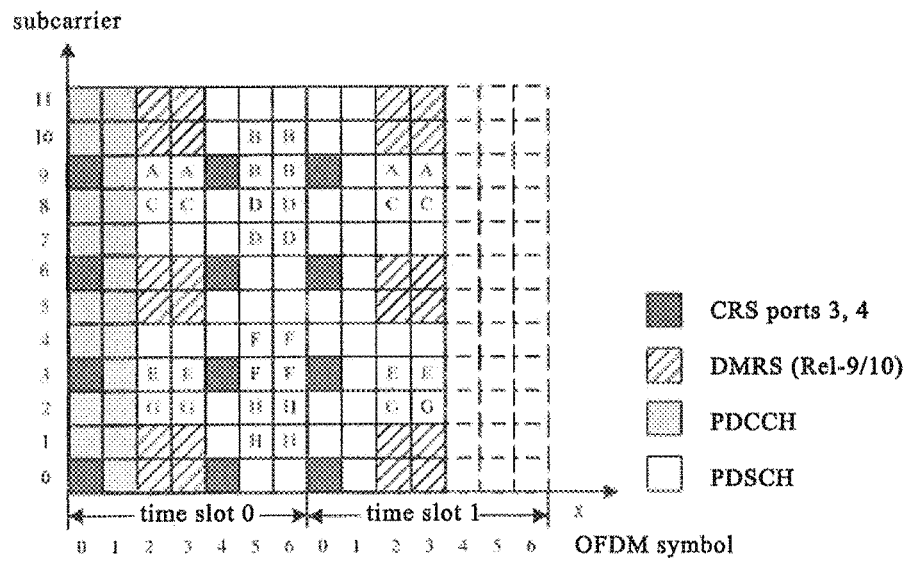
Figure 5D:
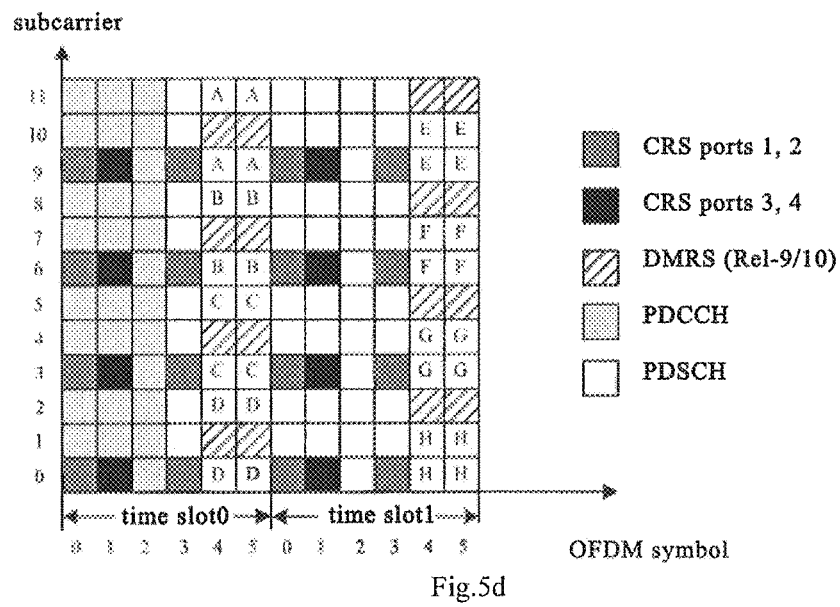

FIGS. 5c and 5d each shows another 32-port reference signal patterns. The 32-port reference signal pattern in FIG. 5c may applied to the DwPTS including 11 or 12 OFDM symbols, while that in FIG. 5d may be applied to a sub-frame using an extended CP and having a length of 12 symbols. In FIGS. 5c and 5d, the 32-port CSI-RS includes 4 groups of 8-port CSI-RS (each group of 8-port CSI-RS correspond to the REs marked with two different letters), and the CSI-RS with the same letter form a sub-group of OCC=4 and are multiplexed using the 4-bit OCC. It should be appreciated that, FIGS. 5c and 5d merely show two possible 32-port reference signal patterns. Based on the above-mentioned distribution rule of the 32-port reference signal pattern, some other 32-port reference signal patterns may also be acquired, which will not be particularly defined herein.

According to the 32-port CSI-RS in Method 2, the 32 CSI-RS ports may have the same transmission power, and the OCC used for these ports may be defined using a spreading code in Rel-13.

Method 3

In Method 3, in the 32-port reference signal pattern, 32 RE positions to which one group of 32-port CSI-RS are mapped are the same as the 32 RE positions to which 4 groups of 8-port CSI-RS in the 8-port reference signal pattern are mapped, and each group of 8-port CSI-RS may be multiplexed using the 8-bit OCC.

One PRB may include 5 groups of 8-port CSI-RS, and in the embodiments of the present application, any 4 groups may be selected from the 5 groups of 8-port CSI-RS to form the 32-port CSI-RS. In a possible embodiment of the present disclosure, the REs to which each group of 8-port CSI-RS are mapped may be distributed on the OFDM symbols 5, 6 in slot 0, the OFDM symbols 5, 6 in slot 1, and the OFDM symbols 2, 3 in slot 1. For each group of 8-port CSI-RS, 2 REs on the OFDM symbols 5, 6 in slot 0, 2 REs on the OFDM symbols 5, 6 in slot 1, and 4 REs on OFDM symbols 2, 3 in slot 1 may form a group.

Figure 6A:
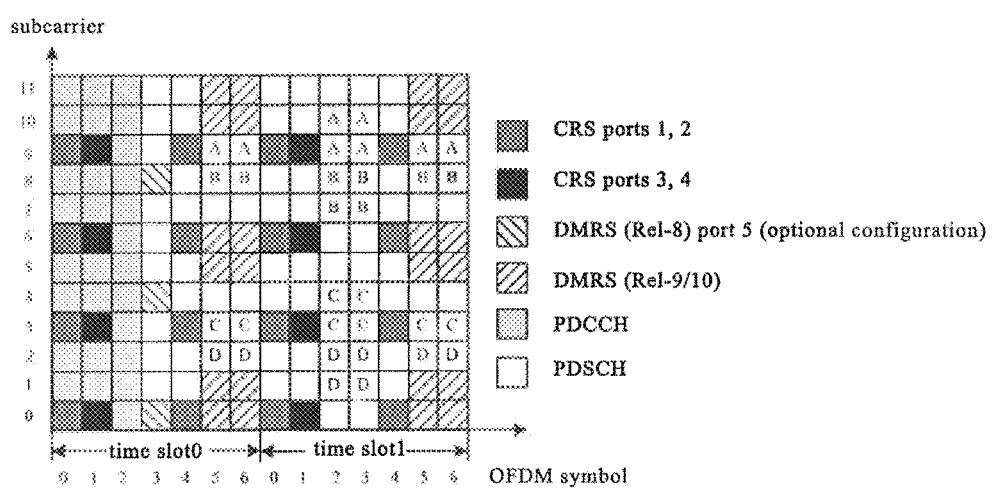
FIGS. 6a, 6b, 6c and 6d each is a schematic diagram showing the 32-port reference signal pattern for method 3 according to embodiments of the present disclosure.

FIG. 6a illustratively shows the 32-port reference signal pattern in Method 3. In FIG. 6a, each square represents one RE. The square corresponding to each of REs to which the 32-port CSI-RS are mapped is marked with a letter. The 32-port reference signal pattern in FIG. 6a includes 4 groups of 8-port CSI-RS, and the REs to which the 4 groups of 8-port CSI-RS are mapped are marked as A to D. The REs marked as A are the same as the REs to which one group of 8-port CSI-RS in the 8-port reference signal pattern are mapped. Identically, the REs marked as B, the REs marked as C, and the REs marked as D are the same as the REs to which one group of 8-port CSI-RS in the 8-port reference signal pattern are mapped.

To be specific, the REs marked as A on the OFDM symbols 5 and 6 in slot 0, the REs marked as A on the OFDM symbols 5 and 6 in slot 1 and the REs marked as A on the OFDM symbols 2 and 3 in slot 1 may form one sub-group in the TDM mode in conjunction with the FDM mode. Similarly, the REs marked as B, C and D may form the other three sub-groups in the TDM mode in conjunction with the FDM mode.

The CSI-RSs corresponding to the same letter may form a sub-group of OCC=8, and this sub-group may be multiplexed using the 8-bit OCC, e.g., multiplexed in a mode in Table 1.

TABLE 1

| OCC Index | OCC used for each group of REs corresponding to 8 ports (OCC = 8) | | | | | | | |
|---|---|---|---|---|---|---|---|---|
| 0 | 1 | 1 | 1 | 1 | 1 | 1 | 1 | 1 |
| 1 | 1 | 1 | 1 | 1 | −1 | −1 | −1 | −1 |
| 2 | 1 | 1 | −1 | −1 | −1 | −1 | 1 | 1 |
| 3 | 1 | −1 | 1 | −1 | 1 | −1 | 1 | −1 |
| 4 | −1 | −1 | 1 | 1 | −1 | −1 | 1 | 1 |
| 5 | −1 | 1 | 1 | −1 | −1 | 1 | 1 | −1 |
| 6 | 1 | −1 | −1 | 1 | −1 | 1 | 1 | −1 |
| 7 | 1 | −1 | 1 | −1 | −1 | 1 | −1 | 1 |

Hence, in the embodiments of the present, through the TDD mode in conjunction with the FDM mode as well as the use of 8-bit OCC, it is able to achieve the full-power utilization of the pilot, thereby to enable a pilot transmission power to be the same as the data transmission power.

Figure 6B:
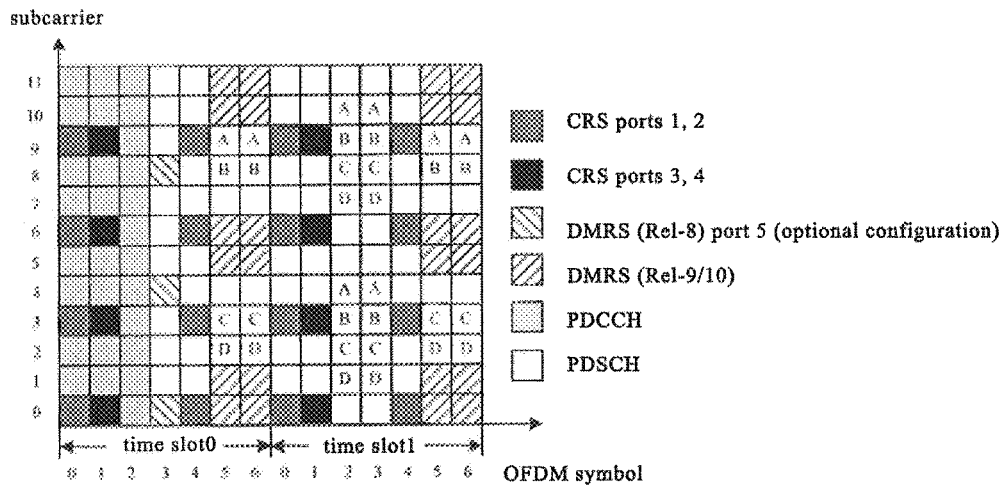

FIG. 6b illustratively shows another 32-port reference signal pattern in Method 3. FIG. 6b differs from FIG. 6a in that one sub-group of REs (i.e., the REs to which the 8-port CSI-RS in the 8-port reference signal pattern are mapped) are distributed on different OFDM symbols in slot 1. In FIG. 6b, the CSI-RSs corresponding to the same letter may form one sub-group of OCC=8 and may be multiplexed using the 8-bit OCC, e.g., multiplexed in a mode as shown in Table 1.

It should be appreciated that, FIGS. 6a and 6b merely show the possible 32-port reference signal patterns. Based on the above-mentioned distribution rule of the 32-port reference signal pattern, some other 32-port reference signal patterns may also be acquired. For example, the 4 sub-groups of REs may be located at any positions on the OFDM symbols 2, 3, and the unused REs may be located at any positions in the case of not overlapping each other, and each sub-group may be further divided on a frequency domain into two sets non-adjacent to each other, which will not be particularly defined herein.

In the embodiments of the present disclosure, based on the principle of Method 3, it is also able to acquire the 32-port reference signal pattern in a DwPTS region of a TDD sub-frame.

Figure 6C:
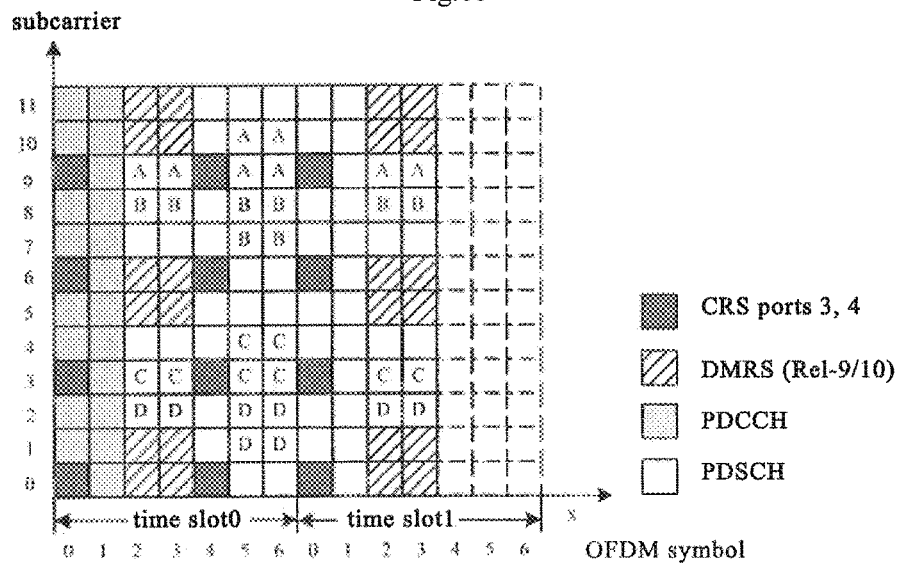
Figure 6D:
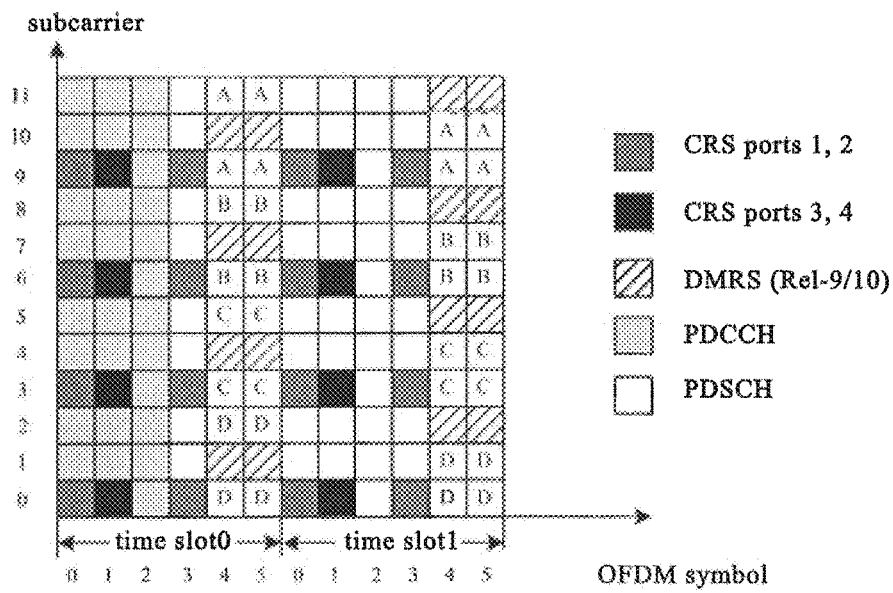

FIGS. 6c and 6d each shows another 32-port reference signal pattern. The 32-port reference signal pattern in FIG. 6c may be applied to the DwPTS including 11 or 12 OFDM symbols, while that in FIG. 6d may be applied to a sub-frame using an extended CP and having a length of 12 symbols. In FIGS. 6c and 6d, the 32-port CSI-RS includes 4 groups of 8-port CSI-RS, and the CSI-RS with the same letter form a sub-group of OCC=8 and are multiplexed using the 8-bit OCC. It should be appreciated that, FIGS. 6c and 6d merely show two possible 32-port reference signal patterns. Based on the above-mentioned distribution rule of the 32-port reference signal pattern, some other 32-port reference signal patterns may also be acquired, and thus will not be particularly defined herein.

(2) 24-Port Reference Signal Pattern
Method 1

In Method 1, in the 24-port reference signal pattern, 24 RE positions to which one group of 24-port CSI-RS are mapped are the same as 24 RE positions to which 6 groups of 4-port CSI-RS in the 4-port reference signal pattern are mapped, and each group of 4-port CSI-RS are multiplexed using the 4-bit OCC.

One PRB may include 10 groups of 4-port CSI-RS, and in the embodiments of the present application, any 6 groups of 4-port CSI-RS may be selected to form the 24-port CSI-RS. In a possible embodiment of the present disclosure, any 3 groups of 4-port CSI-RS on OFDM symbols 2 and 3 in slot 1 may be combined with 3 groups of 4-port CSI-RS on OFDM symbols 5 and 6 in slot 0 and slot 1, so as to form the 24-port CSI-RS.

Figure 7A:
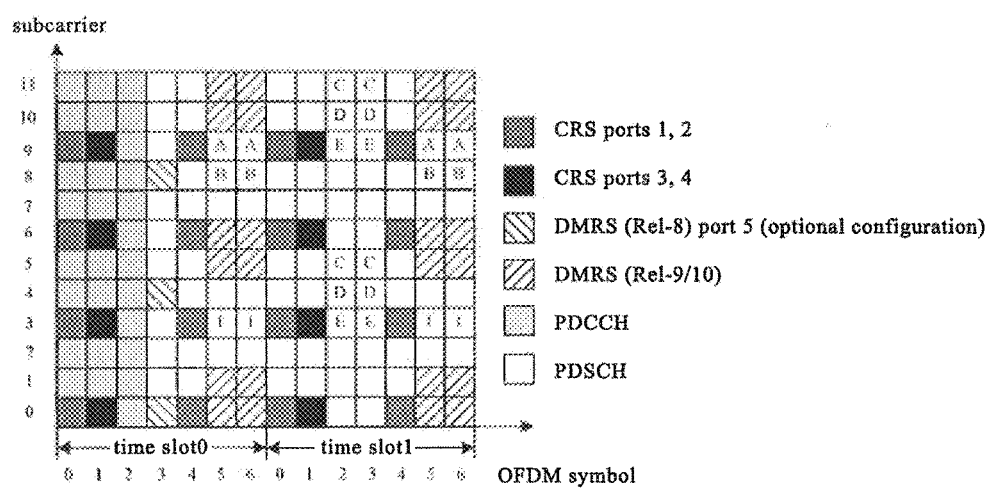
FIGS. 7a, 7b, 7c and 7d each is a schematic diagram showing a 24-port reference signal pattern for method 1 according to embodiments of the present disclosure.

FIG. 7a illustratively shows the 24-port reference signal pattern in Method 1. The REs marked as A on the OFDM symbols 5, 6 in slot 0 and the REs marked as A on the OFDM symbols 5, 6 in slot 1 form one sub-group in the TDD mode. Similarly, the REs marked as B and the REs marked as 1 on the OFDM symbols 5, 6 in slot 0 and slot 1 respectively form one sub-group. The REs marked as C on the OFDM symbols 2, 3 in slot 1 form one sub-group in the TDM mode in conjunction with the FDM mode. Similarly, the REs marked as D and the REs marked as E on the OFDM symbols 2, 3 in slot 1 respectively form one sub-group.

The CSI-RSs corresponding to the same letter may form a sub-group of OCC=4, and this sub-group may be multiplexed using the 4-bit OCC (i.e., OCC=4).

Figure 7B:
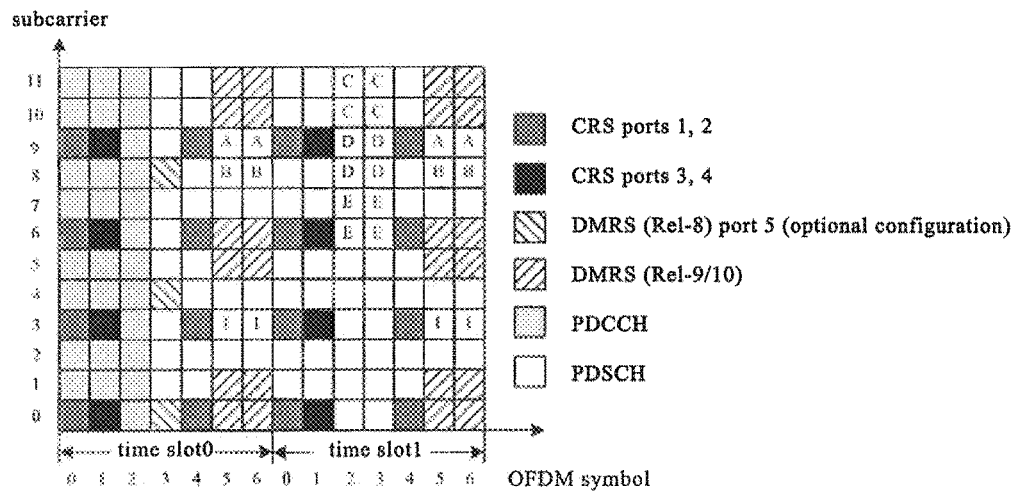

FIG. 7b illustratively shows another 24-port reference signal pattern in Method 1. FIG. 7b differs from FIG. 7a in that the CSI-RSs on the OFDM symbols 2 and 3 in slot 1 belong to different sub-groups. In FIG. 7b, the CSI-RSs corresponding to the same letter may be multiplexed using the 4-bit OCC.

It should be appreciated that, FIGS. 7a and 7b merely show the possible 24-port reference signal patterns. Based on the above-mentioned distribution rule of the 24-port reference signal pattern, some other 24-port reference signal patterns may also be acquired, and thus will not be particularly defined herein.

Figure 7C:
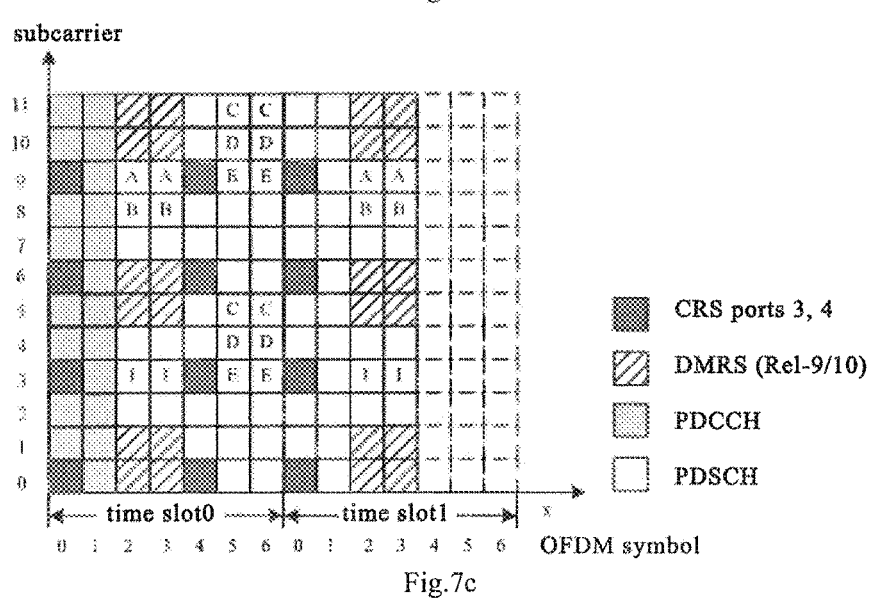
Figure 7D:
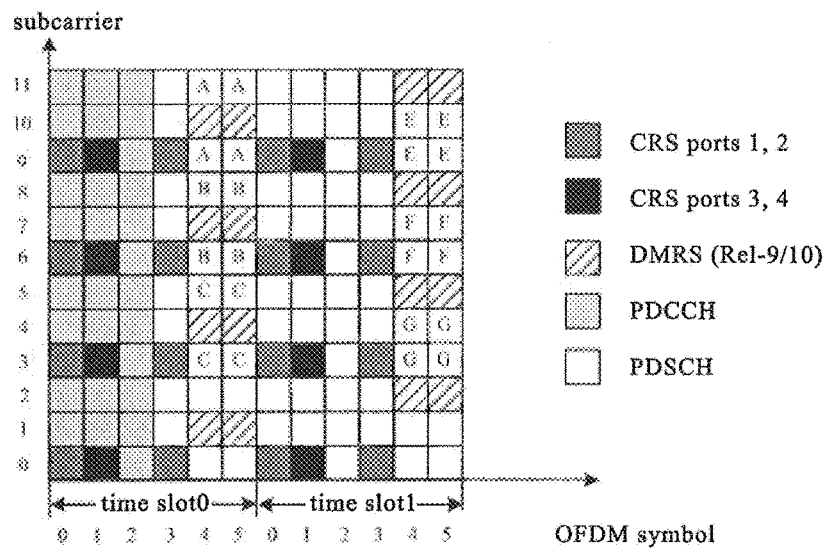

FIGS. 7c and 7d each shows another 24-port reference signal pattern. The 24-port reference signal pattern in FIG. 7c may be applied to the DwPTS including 11 or 12 OFDM symbols, while that in FIG. 7d may be applied to a sub-frame using an extended CP and having a length of 12 symbols. In FIGS. 7c and 7d, the 24-port reference signal pattern includes 6 groups of 4-port CSI-RS. Each group is marked with a same letter, and the CSI-RSs with the same letter form a sub-group of OCC=4 and are multiplexed using the 4-bit OCC. It should be appreciated that, FIGS. 7c and 7d merely show two possible 24-port reference signal patterns. Based on the above-mentioned distribution rule of the 24-port reference signal pattern, some other 24-port reference signal patterns may also be acquired, and thus will not be particularly defined herein.

Through the 24-port CSI-RS in Method 1, the 24 CSI-RS ports may have the same transmission power, and the OCC used for these ports may be defined using a spreading code in Rel-13.

Method 2

In Method 2, in the 24-port reference signal pattern, 24 RE positions to which one group of 24-port CSI-RS are mapped are the same as 24 RE positions to which 3 groups of 8-port CSI-RS in the 8-port reference signal pattern are mapped. Two sub-groups of each group of 8-port CSI-RS are each multiplexed using the 4-bit OCC, and each sub-group is mapped to the REs corresponding to 4 ports.

One PRB may include 5 groups of 8-port CSI-RS, and in the embodiments of the present application, any 3 groups may be selected from the 5 groups of 8-port CSI-RS to form the 24-port CSI-RS.

Figure 8A:
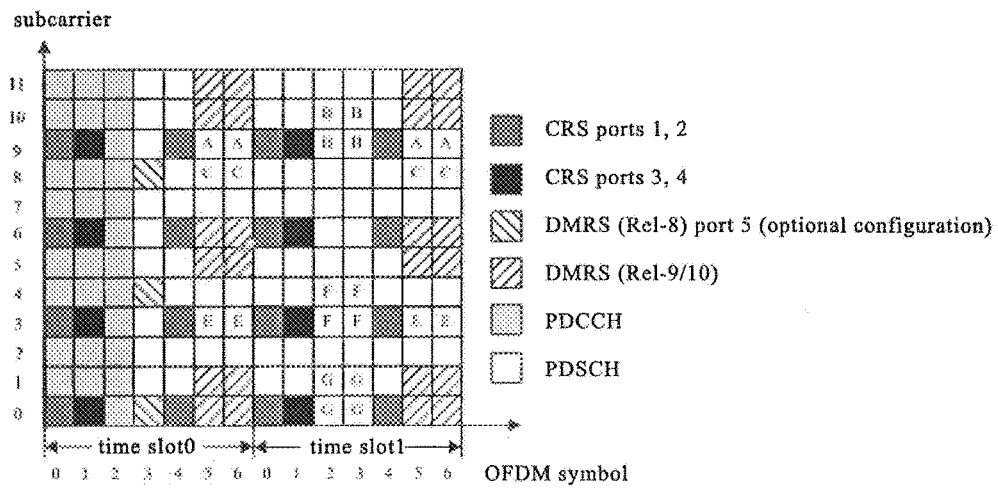
FIGS. 8a, 8b, 8c and 8d each is a schematic diagram showing the 24-port reference signal pattern for method 2 according to embodiments of the present disclosure.

FIG. 8a illustratively shows another 24-port reference signal pattern in Method 2. In FIG. 8a, the REs marked as A on the OFDM symbols 5, 6 in slot 0 and the REs marked as A on the OFDM symbols 5, 6 in slot 1 form one sub-group in the TDM mode. Similarly, the REs marked as C on the OFDM symbols 5, 6 in slot 0 and slot 1 form one sub-group. The REs marked as B on the OFDM symbols 2, 3 in slot 1 form one sub-group in the TDM mode in conjunction with the FDM mode. The CSI-RSs corresponding to the same letter form one sub-group of OCC=4 and are multiplexed using the 4-bit OCC.

Figure 8B:
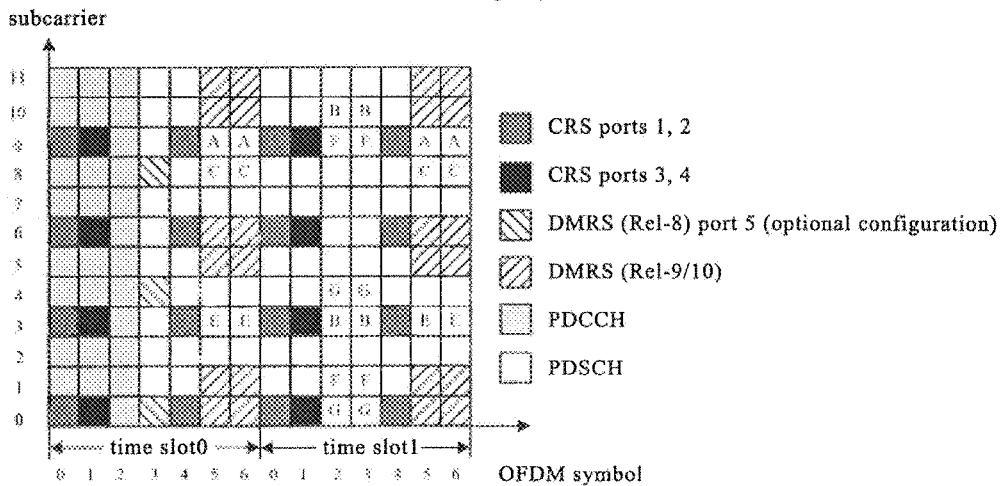

FIG. 8b illustratively shows another 24-port reference signal pattern in Method 2. FIG. 8b differs from FIG. 8a in that the CSI-RSs on the OFDM symbols 2 and 3 in slot 1 belong to different groups. In FIG. 8b, the CSI-RSs corresponding to the same letter may form a sub-group of OCC=4 and may be multiplexed using the 4-bit OCC.

It should be appreciated that, FIGS. 8a and 8b merely show the possible 24-port reference signal patterns. Based on the above-mentioned distribution rule of the 32-port reference signal pattern, some other 32-port reference signal patterns may also be acquired.

Figure 8C:
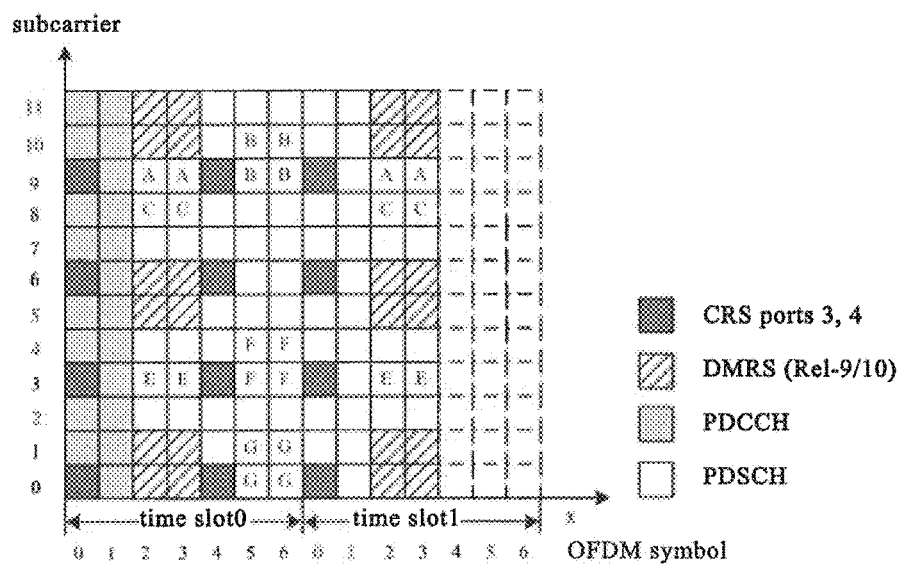
Figure 8D:
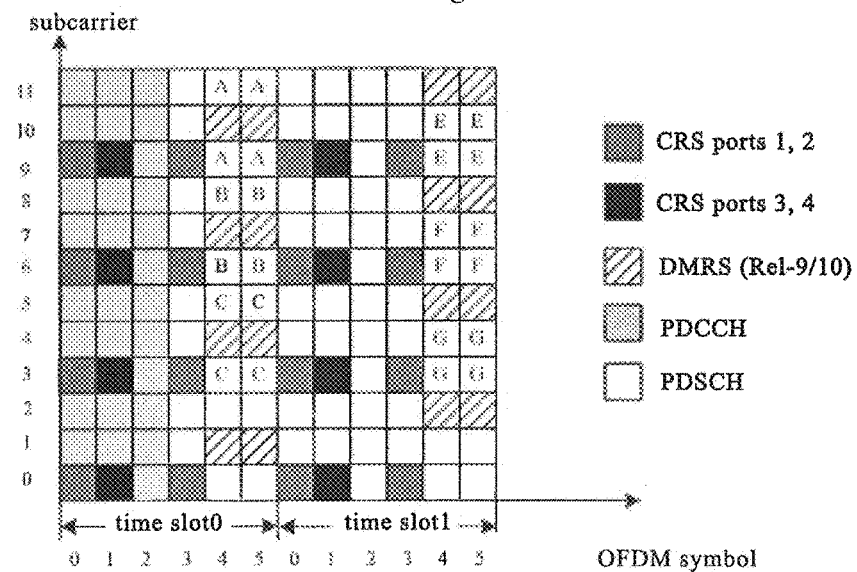

FIGS. 8c and 8d each shows another 24-port reference signal pattern. The 24-port reference signal pattern in FIG. 8c may be applied to the DwPTS including 11 or 12 OFDM symbols, while that in FIG. 8d may be applied to a sub-frame using an extended CP and having a length of 12 symbols. In FIGS. 8c and 8d, the 24-port reference signal pattern includes 3 groups of 8-port CSI-RS (each group of 8-port CSI-RS correspond to the REs marked with two different letters), and the CSI-RS with the same letter form one sub-group of OCC=4 and are multiplexed using the 4-bit OCC. It should be appreciated that, FIGS. 8c and 8d merely show the possible 24-port reference signal patterns. Based on the above-mentioned distribution rule of the 24-port reference signal pattern, some other 24-port reference signal patterns may also be acquired, and thus will not be particularly defined herein.

According to the 24-port CSI-RS in Method 2, the 24 CSI-RS ports may have the same transmission power, and the OCC used for these ports may be defined using a spreading code in Rel-13.

Method 3

In Method 3, in the 24-port reference signal pattern, the 24 RE positions to which one group of 24-port CSI-RS are mapped are the same as the 24 RE positions to which 3 groups of 8-port CSI-RS in the 8-port reference signal pattern are mapped, and each group of 8-port CSI-RS are multiplexed using the 8-bit OCC.

One PRB may include 5 groups of 8-port CSI-RS, and any 3 groups may be selected from the 5 groups of 8-port CSI-RS to form the 24-port CSI-RS.

Figure 9A:
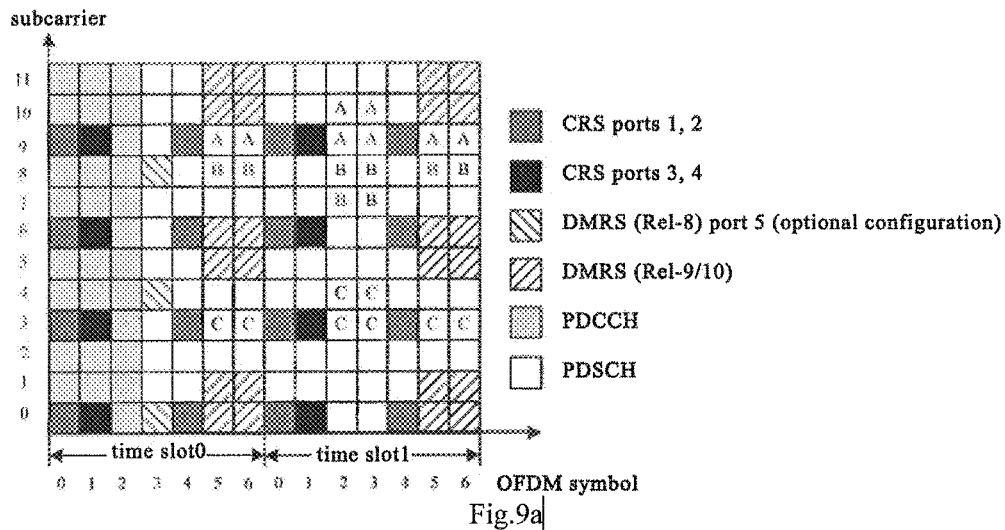
FIGS. 9a, 9b, 9c and 9d each is a schematic diagram showing the 24-port reference signal pattern for method 3 according to embodiments of the present disclosure.

FIG. 9a illustratively shows another 24-port reference signal pattern in Method 3. In FIG. 9a, the REs marked as A on the OFDM symbols 5, 6 in slot 0, the REs marked as A on the OFDM symbols 5, 6 in slot 1, and the REs marked as A on the OFDM symbols 2, 3 in slot 1 form one sub-group in the TDM mode in conjunction with the FDM mode. Similarly, the REs marked as B and the REs marked as C form one sub-group respectively.

The CSI-RSs corresponding to the same letter may form a sub-group of OCC=8, and this sub-group may be multiplexed using the 8-bit OCC.

Hence, in the embodiments of the present, through the TDD mode in conjunction with the FDM mode as well as the use of 8-bit OCC, it is able to achieve the full-power utilization of the pilot signal, thereby to enable a pilot transmission power to be the same as the data transmission power.

Figure 9B:
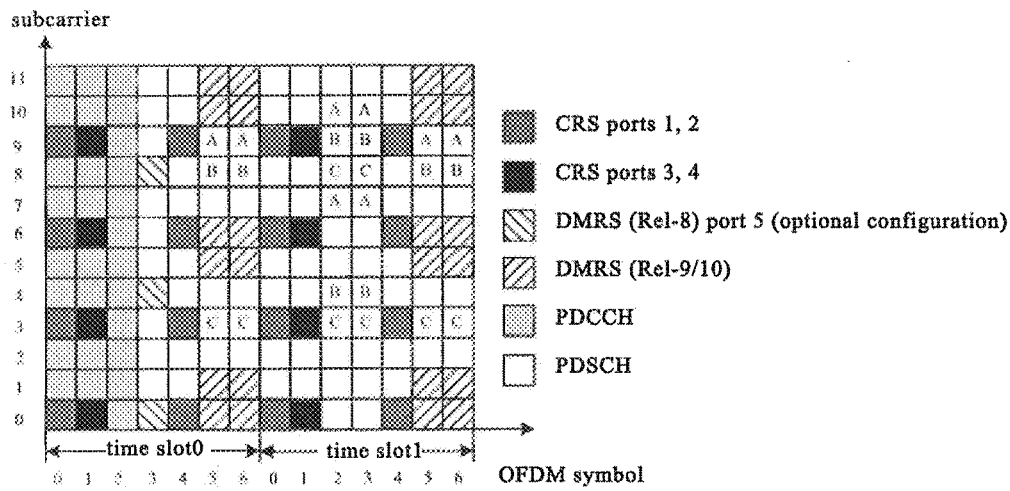

FIG. 9b illustratively shows another 24-port reference signal pattern in Method 3. FIG. 9b differs from FIG. 9a in that one sub-group of REs (i.e., the REs to which 8-port CSI-RSs in the 8-port reference signal pattern are mapped) are distributed on different OFDM symbols in slot 1. In FIG. 9b, the CSI-RSs corresponding to the same letter may form one sub-group of OCC=8 and may be multiplexed using the 8-bit OCC.

It should be appreciated that, FIGS. 9a and 9b merely show the possible 24-port reference signal patterns. Based on the above-mentioned distribution rule of the 24-port reference signal pattern, some other 24-port reference signal patterns may also be acquired.

Figure 9C:
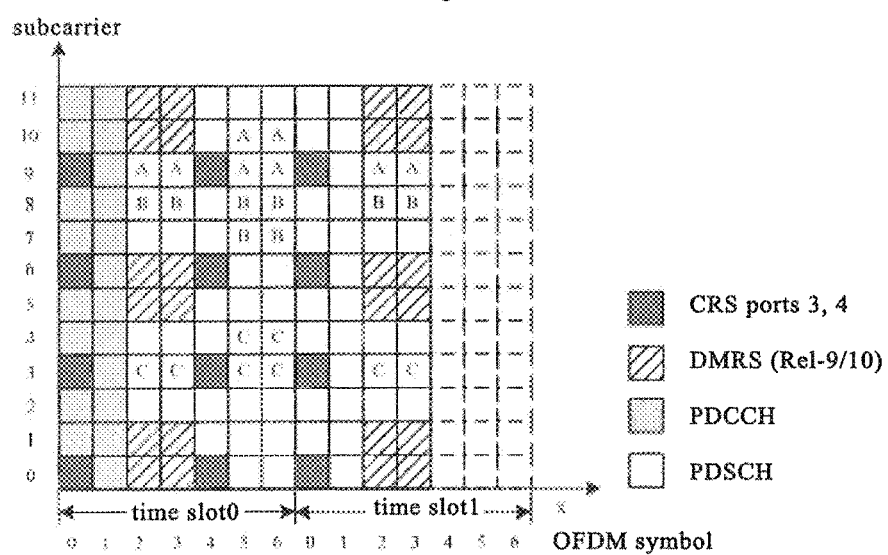
Figure 9D:
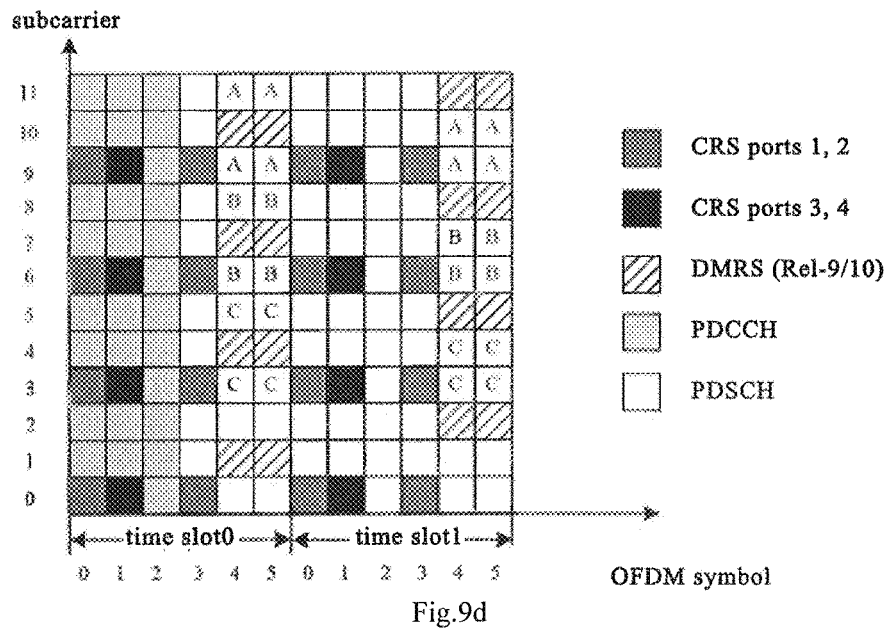

FIGS. 9c and 9d each shows another 24-port reference signal pattern. The 24-port reference signal pattern in FIG. 9c may be applied to the DwPTS including 11 or 12 OFDM symbols, while that in FIG. 9d may be applied to a sub-frame using an extended CP and having a length of 12 symbols. In FIGS. 9c and 9d, the 24-port reference signal pattern includes 3 groups of 8-port CSI-RS, and the CSI-RSs with the same letter form one sub-group of OCC==8 and are multiplexed using the 8-bit OCC. It should be appreciated that, FIGS. 9c and 9d merely show the possible 24-port reference signal patterns. Based on the above-mentioned distribution rule of the 24-port reference signal pattern, some other 24-port reference signal patterns may also be acquired, and thus will not be particularly defined herein.

The 18-port CSI-RS, the 20-port CSI-RS and the 28-port CSI-RS may also be achieved on the basis of the above-mentioned mapping principle for the 32-port or 24-port CSI-RS. As compared with the determination of the REs to which the 24-port or 32-port CSI-RS are mapped in accordance with the 8-port reference signal pattern, in the case of determining the REs to which the 18-port, 20-port or 28-port CSI-RS are mapped, the quantity of the CSI-RS ports multiplexed by each sub-group may decrease. In addition, the quantity of the REs to which each group of CSI-RS are mapped may decrease or remain unchanged.

(3) 18-Port Reference Signal Pattern

In the 18-port reference signal pattern, 18 RE positions to which one group of 18-port CSI-RS are mapped are the same as 18 of the 24 RE positions to which 3 groups of 8-port CSI-RS are mapped in the 8-port reference signal pattern. Each group of 6-port CSI-RS are mapped to 6 REs and multiplexed using a 6-bit OCC.

Figure 10A:
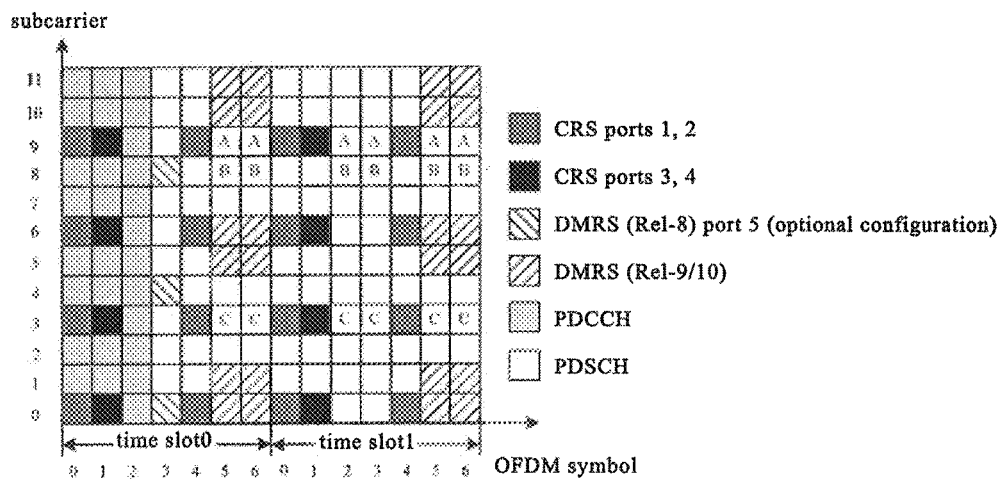
FIGS. 10a, 10b, 10c and 10d each is a schematic diagram showing an 18-port reference signal pattern according to embodiments of the present disclosure.

FIG. 10a illustratively shows the 18-port reference signal pattern. In FIG. 10a, each square represents one RE. The square corresponding to each of REs to which the 18-port CSI-RS are mapped is marked with a letter. The 18-port reference signal pattern in FIG. 10a includes 3 groups of 6-port CSI-RS, marked as A to C. The CSI-RSs corresponding to the same letter form one sub-group of OCC=6 and are multiplexed using the 6-bit OCC.

Figure 10B:
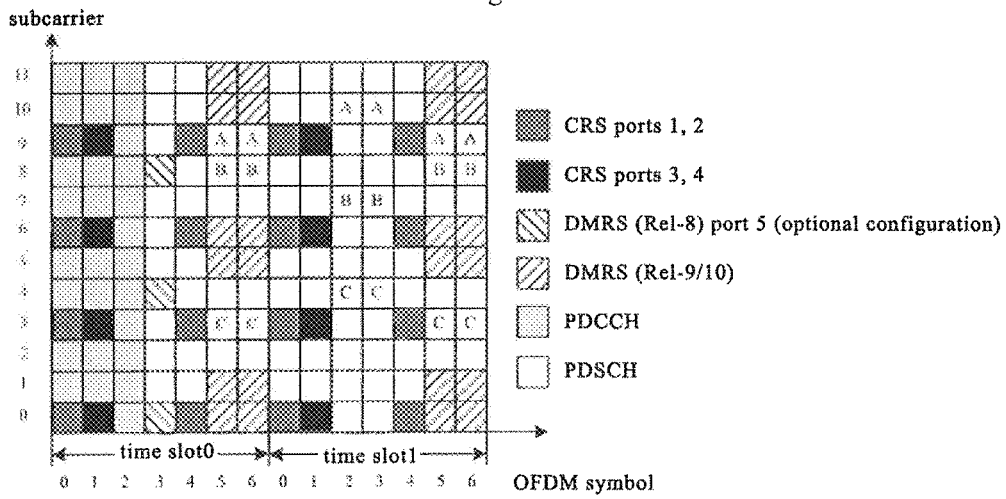

FIG. 10b illustratively shows the other 18-port reference signal pattern. FIG. 10b differs from FIG. 10a in that the CSI-RSs on the OFDM symbols 2, 3 in slot 1 belong to different sub-groups.

It should be appreciated that, FIGS. 10a and 10b merely show the possible 18-port reference signal pattern. Based on the above-mentioned distribution rule of the 18-port reference signal pattern, some other 18-port reference signal patterns may also be acquired.

In the embodiments of the present disclosure, based on the above principle, it is also able to acquire the 18-port reference signal pattern in a DwPTS region of a TDD sub-frame.

Figure 10C:
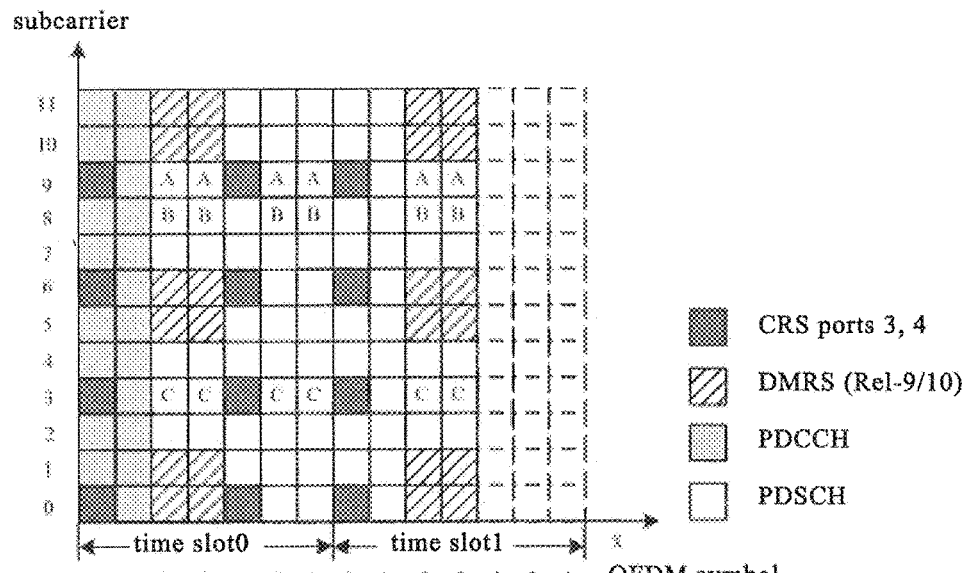
Figure 10D:
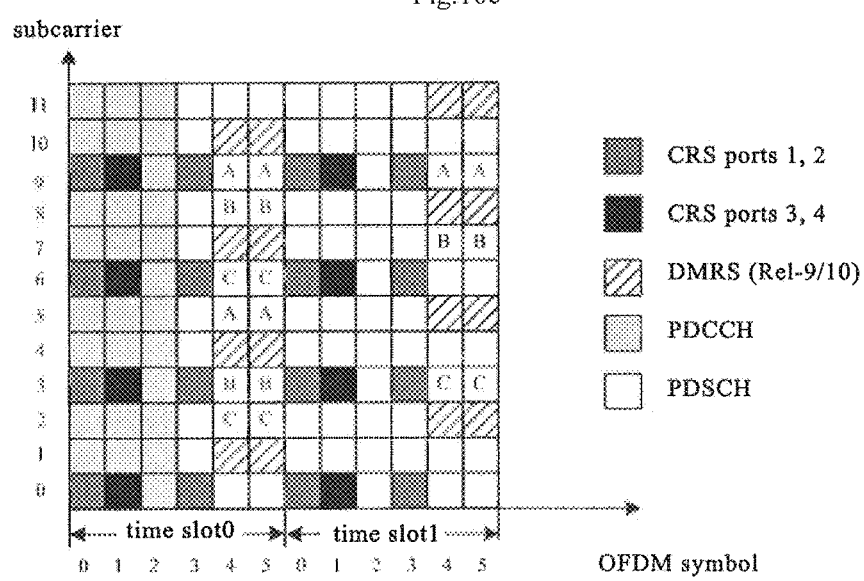

FIGS. 10c and 10d each shows another 18-port reference signal pattern. The 18-port reference signal pattern in FIG. 10c may be used for the DwPTS including 11 or 12 OFDM symbols, while that in FIG. 10d may be used for a sub-frame using an extended CP and having a length of 12 symbols. In FIGS. 10c and 10d, the 18-port reference signal pattern includes 3 groups of 8-port CSI-RS. The CSI-RS with the same letter form a sub-group and are multiplexed using the 6-bit OCC. It should be appreciated that, FIGS. 10c and 10d merely show the possible 18-port reference signal patterns. Based on the above-mentioned distribution rule of the 18-port reference signal pattern, some other 18-port reference signal patterns may also be acquired, and thus will not be particularly defined herein.

In a possible embodiment of the present disclosure, in the 18-port reference signal pattern, the 24 RE positions to which one group of 18-port CSI-RS are mapped are the same as the RE positions to which 3 groups of 8-port CSI-RS in the 8-port reference signal pattern are mapped. Each group of 6-port CSI-RS are mapped to 8 REs and multiplexed using 6 code words of the 8-bit OCC, like FIGS. 7a to 7d.

Through the 18-port CSI-RS, the 18 CSI-RS ports may have the same transmission power, and the OCC used for these ports may be defined using the spreading code in Rel-13.

(4) 20-Port Reference Signal Pattern

In the 20-port reference signal pattern, the 20 RE positions to which one group of 20-port CSI-RS are mapped are the same as 20 of all the RE positions to which 4 groups of 8-port CSI-RS are mapped in the 8-port reference signal pattern. Each group of 5-port CSI-RS are mapped to 5 REs and multiplexed using the 5-bit OCC.

Figure 11A:
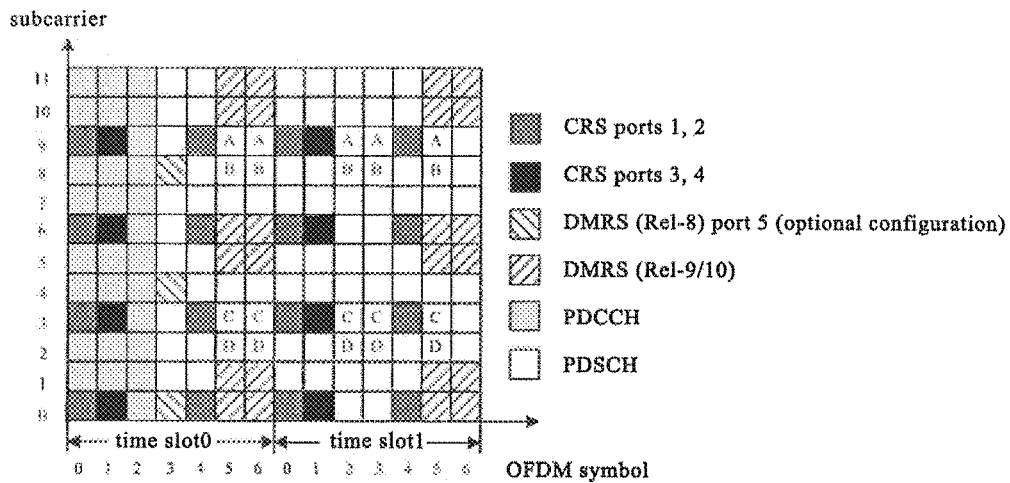
FIGS. 11a, 11b, 11c and 11d each is a schematic diagram showing a 20-port reference signal pattern according to embodiments of the present disclosure.

FIG. 11a illustratively shows a 20-port reference signal pattern. In FIG. 11a, each square represents one RE. The 20-port reference signal pattern in FIG. 11a includes 4 groups of 5-port CSI-RS, which are marked as A to D. The CSI-RSs corresponding to the same letter form one sub-group of OCC=5 and are multiplexed using the 5-bit OCC.

Figure 11B:
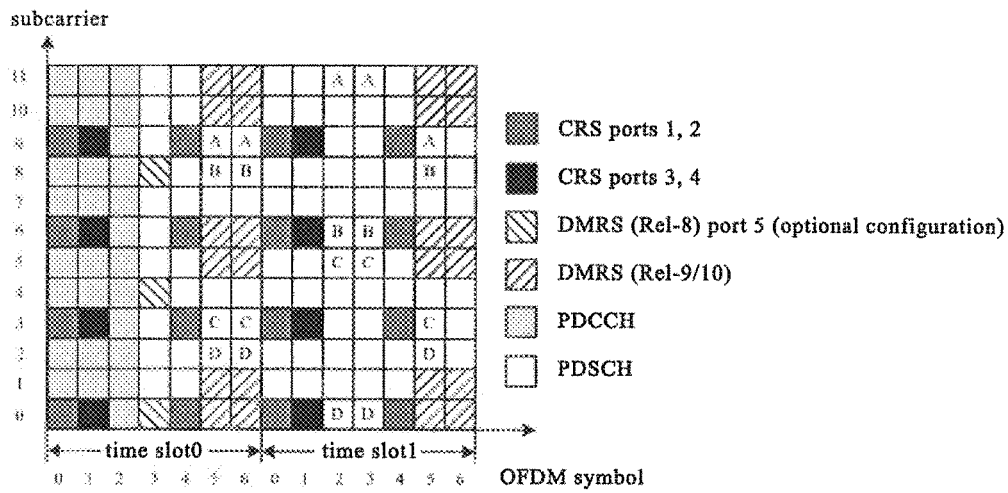

FIG. 11b illustratively shows another 20-port reference signal pattern. FIG. 11b differs from FIG. 11a in that the CSI-RSs on the OFDM symbols 2, 3 in slot 1 belong to different sub-groups.

It should be appreciated that, FIGS. 11a and 11b merely show the possible 20-port reference signal patterns. Based on the above-mentioned distribution rule of the 20-port reference signal pattern, some other 20-port reference signal patterns may also be acquired.

In the embodiments of the present disclosure, based on the above principle, it is also able to acquire the 20-port reference signal pattern in a DwPTS region of a TDD sub-frame.

Figure 11C:
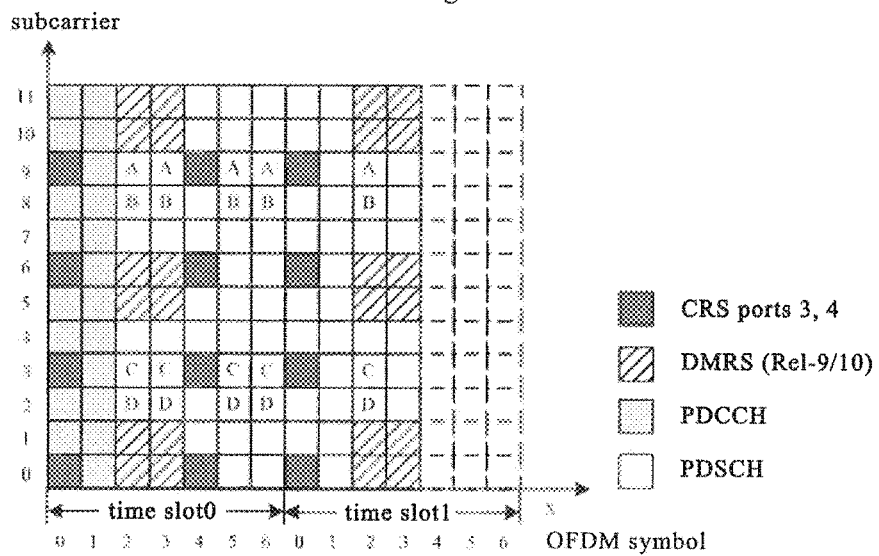
Figure 11D:
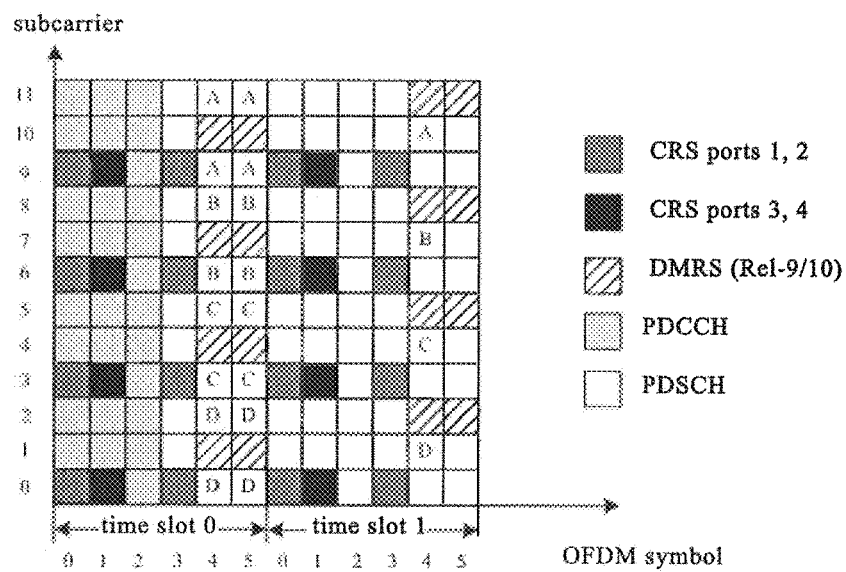

FIGS. 11c and 11d show the other 20-port reference signal patterns. The 20-port reference signal pattern in FIG. 11c may be used for the DwPTS including 11 or 12 OFDM symbols, while that in FIG. 11d may be used for a sub-frame using an extended CP and having a length of 12 symbols. In FIGS. 11c and 11d, the 20-port reference signal pattern includes 4 groups of 8-port CSI-RS. The CSI-RS marked with the same letter form one sub-group and are multiplexed using the 5-bit OCC. It should be appreciated that, FIGS. 11c and 11d merely show the possible 20-port reference signal patterns. Based on the above-mentioned distribution rule of the 20-port reference signal pattern, some other 20-port reference signal patterns may also be acquired, and thus will not be particularly defined herein.

In a possible embodiment of the present disclosure, in the 20-port reference signal pattern, the 32 RE positions to which one group of 20-port CSI-RS are mapped are the same as all the RE positions to which 4 groups of 8-port CSI-RS in the 8-port reference signal pattern are mapped. Each group of 5-port CSI-RS are mapped to 8 REs and multiplexed using 5 code words of the 8-bit OCC, like FIGS. 6a to 6d.

According to the above 20-port reference signal patterns, the 20 CSI-RS ports may have the same transmission power, and the OCC used for these ports may be defined using the spreading code in Rel-13.

(5) 28-Port Reference Signal Pattern

In the 28-port reference signal pattern, the 28 RE positions to which one group of 28-port CSI-RS are mapped are the same as 28 of all the RE positions to which 4 groups of 8-port CSI-RS are mapped in the 8-port reference signal pattern. Each group of 7-port CSI-RS are mapped to 7 REs and multiplexed using a 7-bit OCC.

Figure 12A:
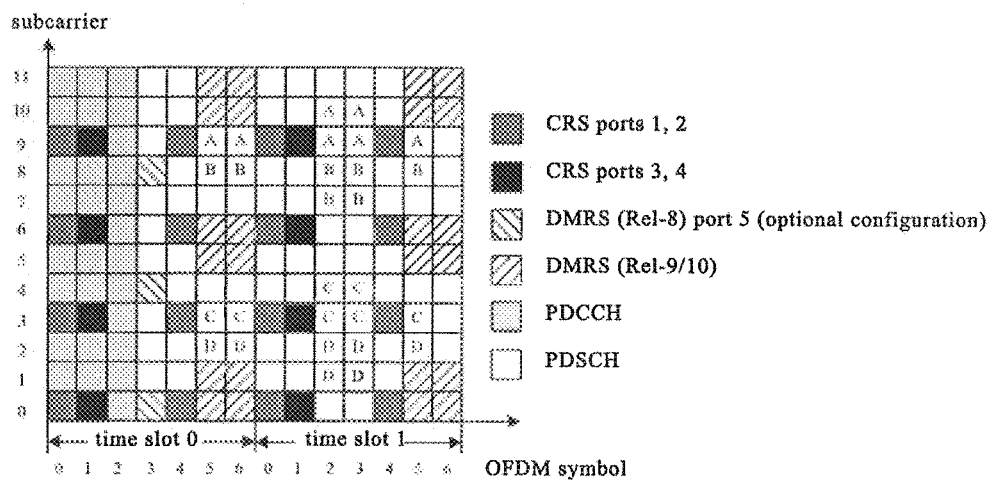
FIGS. 12a, 12b, 12c and 12d each is a schematic diagram showing a 28-port reference signal pattern according to embodiments of the present disclosure.

FIG. 12a illustratively shows the 28-port reference signal pattern. In FIG. 12a, each square represents one RE. The 28-port reference signal pattern in FIG. 12a includes 4 groups of 7-port CSI-RS, which are marked as A to D. The CSI-RSs corresponding to the same letter form a sub-group of OCC=7 and are multiplexed using the 7-bit OCC.

Figure 12B:
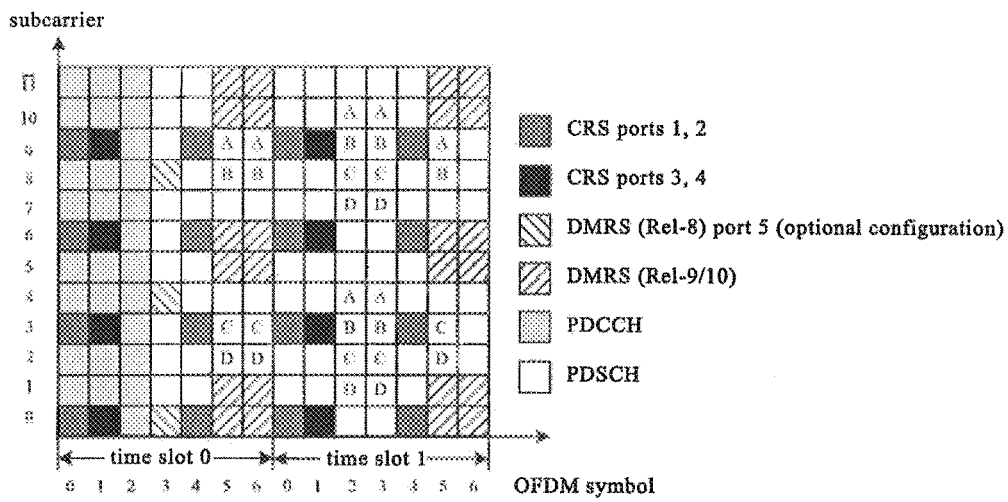

FIG. 12b illustratively shows the other 28-port reference signal pattern. FIG. 12b differs from FIG. 12a in that the CSI-RSs on the OFDM symbols 2, 3 in slot 1 belong to different sub-groups.

It should be appreciated that, FIGS. 12a and 12b merely show the possible 28-port reference signal patterns. Based on the above-mentioned distribution rule of the 28-port reference signal pattern, some other 28-port reference signal patterns may also be acquired.

In the embodiments of the present disclosure, based on the above principle, it is also able to acquire the 28-port reference signal pattern in a DwPTS region of a TDD sub-frame.

Figure 12C:
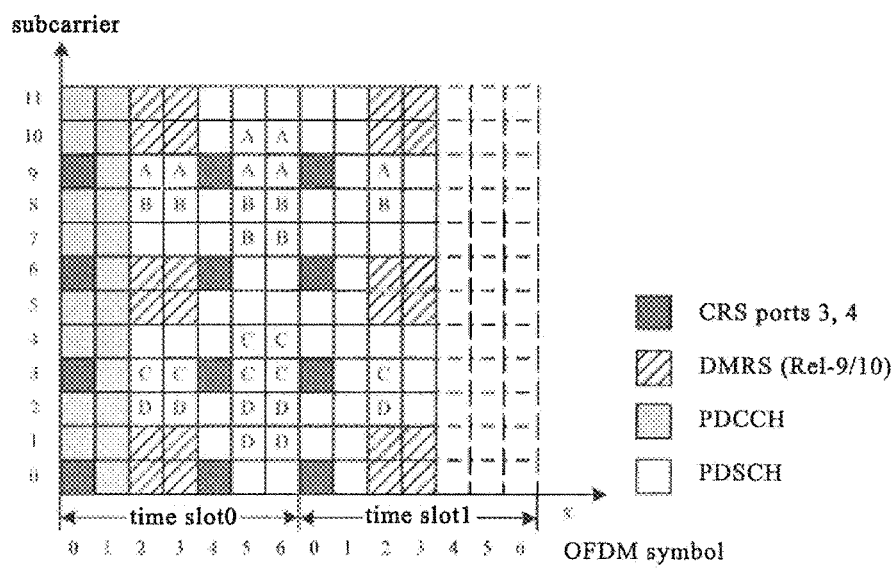
Figure 12D:
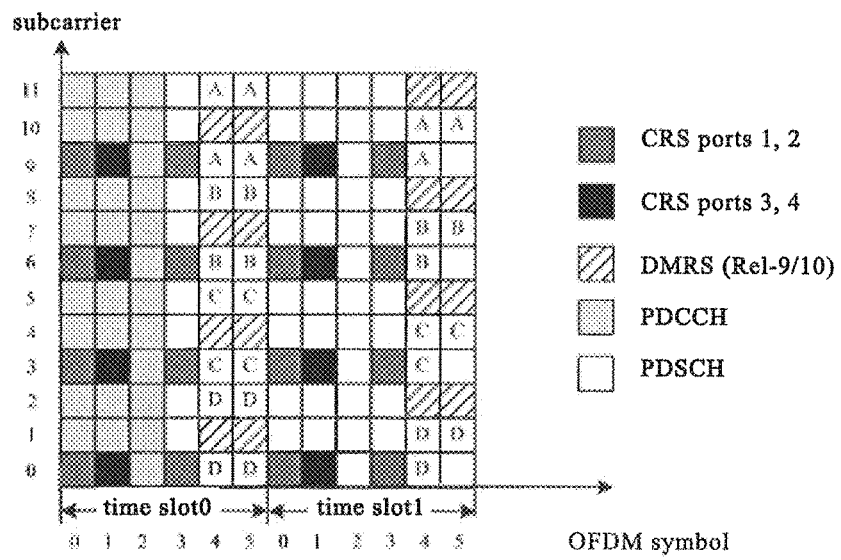

FIGS. 12c and 12d show the other 28-port reference signal patterns. The 28-port reference signal pattern in FIG. 12c may be used for the DwPTS including 11 or 12 OFDM symbols, while that in FIG. 12d may be used for a sub-frame using an extended CP and having a length of 12 symbols. In FIGS. 12c and 12d, the 28-port reference signal pattern includes 4 groups of 8-port CSI-RS. The CSI-RS with the same letter form one sub-group and are multiplexed using the 7-bit OCC. It should be appreciated that, FIGS. 12c and 12d merely show the possible 28-port reference signal patterns. Based on the above-mentioned distribution rule of the 28-port reference signal pattern, some other 28-port reference signal patterns may also be acquired, and thus will not be particularly defined herein.

In a possible embodiment of the present disclosure, in the 28-port reference signal pattern, the 32 RE positions to which one group of 28-port CSI-RS are mapped are the same as all the RE positions to which 4 groups of 8-port CSI-RS in the 8-port reference signal pattern are mapped. Each group of 7-port CSI-RS are mapped to 8 REs and multiplexed using 7 code words of the 8-bit OCC, like FIGS. 6a to 6d.

According to the above 28-port reference signal pattern, the 28 CSI-RS ports may have the same transmission power, and the OCC used for these ports may be defined using the spreading code in Rel-13.

As mentioned above, in the embodiments of the present disclosure, the 18-port, 20-port, 24-port, 28-port or 32-port reference signal pattern may be acquired in accordance with the 4-port or 8-port reference signal pattern. In the case of mapping the reference signal, the RE to which the CSI-RS is mapped may be determined in accordance with the 18-port, 20-port, 24-port, 28-port or 32-port reference signal pattern, and then resource mapping may be performed on the CSI-RS in accordance with the RE. As a result, it is able to map the 18-port, 20-port, 24-port, 28-port or 32-port CSI-RS, thereby to transmit the 18-port, 20-port, 24-port, 28-port or 32-port CSI-RS.

Figure 13:
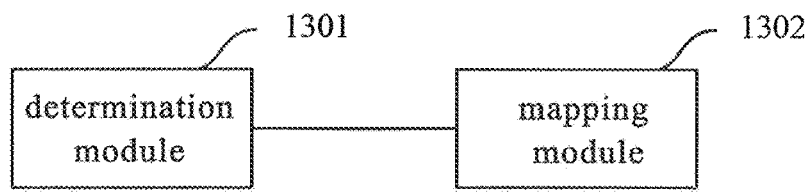
FIG. 13 is a schematic diagram showing a reference signal mapping device according to embodiments of the present disclosure.

Based on an identical inventive concept, the present disclosure further provides in some embodiments a reference signal mapping device for implementing the above-mentioned reference signal mapping method, as shown in FIG. 13. The device may include a determination module 1301 and a mapping module 1302.

The determination module 1301 is configured to determine Resource Elements (REs) to which a Channel State Indication Reference Signal (CSI-RS) is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8. The mapping module 1302 is configured to perform resource mapping on the CSI-RS in accordance with the determined REs.

In a possible embodiment of the present disclosure, N is 18, 20, 24, 28 or 32. In the case that N is 24 or 32, M is 4 or 8, and in the case that N is 18, 20 or 28, M is 8.

How to determine, by the determination module 1301, the REs to which the CSI-RS is mapped in accordance with the N-port reference signal pattern as well as forms of the M-port reference signal pattern may refer to those mentioned above, and thus will not be particularly defined herein.

Based on an identical inventive concept, the present disclosure further provides in some embodiments a base station for implementing the above-mentioned reference signal mapping method.

Figure 14:
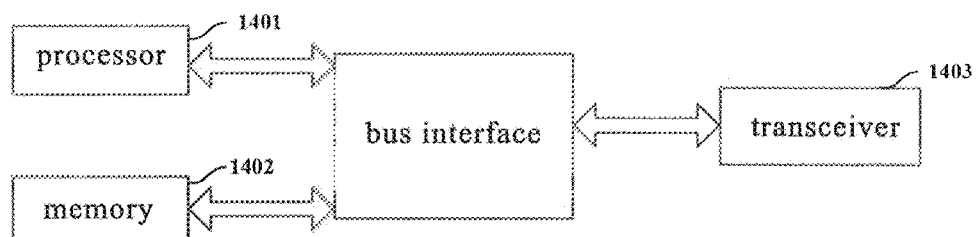
FIG. 14 is a schematic diagram showing a base station according to embodiments of the present disclosure.

Reference is made to FIG. 14, which is a schematic diagram of a base station according to some embodiments of the present disclosure. The base station may include a processor 1401, a memory 1402, a transceiver 1403 and a bus interface.

The processor 1401 may take charge of managing the bus architecture as well as general processings. The memory 1402 may store therein data for the operation of the processor 1401. The transceiver 1403 may be configured to receive and transmit data under the control of the processor 1401.

The bus architecture may include a number of buses and bridges connected to each other, so as to connect various circuits for one or more processors 1401 and one or more memories 1402. In addition, as is known in the art, the bus architecture may be used to connect any other circuits, such as a circuit for a peripheral device, a circuit for a voltage stabilizer and a power management circuit. Bus interfaces are provided, and the transceiver 1403 may consist of a plurality of elements, i.e., a transmitter and a receiver for communication with any other devices over a transmission medium.

The method in the embodiments of the present disclosure may be applied to, or implemented by, the processor 1401. During the implementation, the steps for data transmission may be completed through an integrated logic circuit of hardware in the processor 1401 or instructions in the form of software. The processor 1401 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read Only Memory (ROM), a Programmable ROM (PROM), an Electrically Erasable PROM (EEPROM), or a register. The storage medium may be located in the memory 1402, and the processor 1401 may read information stored in the memory 1402 so as to implement the steps of the method at a control plane through the hardware.

To be specific, the processor 1401 is configured to read the program stored in the memory 1402, so as to:

determine REs to which a CSI-RS is mapped in accordance with an N-port reference signal pattern, N being an integer greater than 16, where RE positions to which an N-port CSI-RS in the N-port reference signal pattern is mapped are determined in accordance with RE positions to which a plurality of groups of M-port CSI-RS in an M-port reference signal pattern are mapped, M being 4 or 8; and perform resource mapping on the CSI-RS in accordance with the determined REs.

In a possible embodiment of the present disclosure, N is 18, 20, 24, 28 or 32. In the case that N is 24 or 32, M is 4 or 8, and in the case that N is 18, 20 or 28, M is 8.

How to determine, by the processor 1401, the REs to which the CSI-RS is mapped in accordance with the N-port reference signal pattern as well as forms of the M-port reference signal pattern may refer to those mentioned above, and thus will not be particularly defined herein.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art may make various modifications and variations without departing from the spirit and scope of the present disclosure, and the present disclosure is intended to include these modifications and variations if these fall within the scope of claims of the present disclosure and equivalents thereof.

What is claimed is:

1. A reference signal mapping method, comprising:
   determining Resource Elements (REs) to which a Channel State Indication Reference Signal (CSI-RS) is mapped in accordance with an N-port reference signal pattern, N being an integer greater than 16, wherein RE positions to which an N-port CSI-RS in the N-port reference signal pattern is mapped are determined in accordance with RE positions to which a plurality of groups of M-port CSI-RSs in an M-port reference signal pattern are mapped, M being 4 or 8; and
   performing resource mapping on the CSI-RS in accordance with the determined REs,
   wherein N is 24 or 32, M is 4, the RE positions to which the N-port CSI-RS in the N-port reference signal pattern is mapped are the same as RE positions to which Q groups of 4-port CSI-RSs in a 4-port reference signal pattern are mapped, and each of the Q groups of 4-port CSI-RSs is multiplexed using four code words of a 4-bit Orthogonal Cover Code (OCC), where $$Q = \frac{N}{4};$$

or
   N is 18, 20, 24, 28 or 32, M is 8, the RE positions to which the N-port CSI-RS in the N-port reference signal pattern is mapped are the same as RE positions to which L groups of 8-port CSI-RSs in an 8-port reference signal pattern are mapped, where in the case that N is 18 or 24, L is 3, and in the case that N is 20, 28 or 32, L is 4.

2. The reference signal mapping method according to claim 1, wherein in the case that M is 8,
   every S ports of the N-port CSI-RS are multiplexed using S code words in 8 code words of an 8-bit OCC, wherein S is 6 or 8 in the case that N is 18, S is 5 or 8 in the case that N is 20, S is 7 or 8 in the case that N is 28, S is 8 in the case that N is 24, and S is 8 in the case that N is 32; or
   every K ports of the N-port CSI-RS are multiplexed using a K-bit OCC, wherein K is 6 in the case that N is 18, K is 5 in the case that N is 20, and K is 7 in the case that N is 28; or
   each of the L groups of 8-port CSI-RSs in the N-port reference signal pattern is divided into two sub-groups of CSI-RSs, each of the two sub-groups of CSI-RSs is multiplexed using 4 code words of the 4-bit OCC, and each of the two sub-groups of CSI-RSs is mapped to RE positions corresponding to the 4-port CSI-RS, wherein N is 24 or 32.

3. The reference signal mapping method according to claim 2, wherein the RE positions to which the N-port CSI-RS in the N-port reference signal pattern is mapped are the same as L*P RE positions to which L groups of the 8-port CSI-RSs in the 8-port reference signal pattern are mapped, wherein P is 6 or 8 in the case that N is 18, P is 5 or 8 in the case that N is 20, P is 7 or 8 in the case that N is 28, P is 8 in the case that N is 24, and P is 8 in the case that N is 32.

4. The reference signal mapping method according to claim 1, wherein in a normal Cyclic Prefix (CP) sub-frame comprising 14 Orthogonal Frequency Division Multiplexing (OFDM) symbols or a Downlink Pilot Time Slot (DwPTS) comprising 11 or 12 OFDM symbols, in the case that M is 4, the 4-port reference signal pattern comprises 10 groups of 4-port CSI-RSs,
   wherein each of 4 groups of the 10 groups of 4-port CSI-RSs is mapped to 4 REs on the first to fourth OFDM symbols in a time division multiplexing mode, and each of the remaining 6 groups of 4-port CSI-RSs are mapped to 4 REs on the fifth and sixth OFDM symbols in the time division multiplexing mode in conjunction with a frequency division multiplexing mode, and
   wherein the first to fourth OFDM symbols are symbols where DeModulation Reference Signals (DMRSs) are located.

5. The reference signal mapping method according to claim 1, wherein in a normal CP sub-frame comprising 14 OFDM symbols or a DwPTS comprising 11 or 12 OFDM symbols, in the case that M is 8, the 8-port reference signal pattern comprises 5 groups of 8-port CSI-RSs, and
   wherein each of the 5 groups of 8-port CSI-RSs comprises two sub-groups of CSI-RSs, each of the two sub-groups of CSI-RSs is multiplexed using 4 code words of the 4-bit OCC, one of the two sub-groups of CSI-RSs is mapped to 4 REs on the first to fourth OFDM symbols in a time division multiplexing mode, and the other one of the two sub-groups of CSI-RSs is mapped to 4 REs on the fifth and sixth OFDM symbols in the time division multiplexing mode in conjunction with a frequency division multiplexing mode, wherein the first to fourth OFDM symbols are symbols where DMRSs are located; or
   each of the 5 groups of 8-port CSI-RSs is mapped to 4 REs on the first to fourth OFDM symbols and 4 REs on the fifth and sixth OFDM symbols in the time division multiplexing mode in conjunction with the frequency division multiplexing mode, wherein the first to fourth OFDM symbols are symbols where DMRSs are located.

6. The reference signal mapping method according to claim 4, wherein in the normal CP sub-frame comprising 14 OFDM symbols, the first to fourth OFDM symbols are: the sixth and seventh OFDM symbols in a first time slot of the sub-frame, and the sixth and seventh OFDM symbols in a second time slot of the sub-frame, and wherein the fifth and sixth OFDM symbols are the third and fourth OFDM symbols in the second time slot of the sub-frame; or wherein in the DwPTS comprising 11 or 12 OFDM symbols, the first to fourth OFDM symbols are: the third and fourth OFDM symbols in a first time slot of the sub-frame, and the third and fourth OFDM symbols in a second time slot of the sub-frame, and wherein the fifth and sixth OFDM symbols are the sixth and seventh OFDM symbols in the first time slot of the sub-frame.

7. The reference signal mapping method according to claim 1, wherein in 12 OFDM symbols of an extended CP sub-frame, each of the plurality of groups of M-port CSI-RSs in the M-port reference signal pattern is mapped to the fifth and sixth OFDM symbols in a first time slot of the sub-frame and the fifth and sixth OFDM symbols in a second time slot of the sub-frame in a time division multiplexing mode in conjunction with a frequency division multiplexing mode.

8. A reference signal mapping device, comprising:
a processor and a memory, wherein the processor is configured to read a program stored in the memory, so as to: determine Resource Elements (REs) to which a Channel State Indication Reference Signal (CSI-RS) is mapped in accordance with an N-port reference signal pattern, N being an integer greater than 16, wherein RE positions to which an N-port CSI-RS in the N-port reference signal pattern is mapped are determined in accordance with RE positions to which a plurality of groups of M-port CSI-RSs in an M-port reference signal pattern are mapped, M being 4 or 8; and
perform resource mapping on the CSI-RS in accordance with the determined REs,
wherein N is 24 or 32, M is 4, the RE positions to which the N-port CSI-RS in the N-port reference signal pattern is mapped are the same as RE positions to which Q groups of 4-port CSI-RSs in a 4-port reference signal pattern are mapped, and each of the Q groups of 4-port CSI-RSs is multiplexed using four code words of a 4-bit Orthogonal Cover Code (OCC), where $$Q = \frac{N}{4};$$

or
N is 18, 20, 24, 28 or 32, M is 8, the RE positions to which the N-port CSI-RS in the N-port reference signal pattern is mapped are the same as RE positions to which L groups of 8-port CSI-RSs in an 8-port reference signal pattern are mapped, where in the case that N is 18 or 24, L is 3, and in the case that N is 20, 28 or 32, L is 4.

9. The reference signal mapping device according to claim 8, wherein in the case that M is 8,
every S ports of the N-port CSI-RS are multiplexed using S code words in 8 code words of an 8-bit OCC, wherein S is 6 or 8 in the case that N is 18, S is 5 or 8 in the case that N is 20, S is 7 or 8 in the case that N is 28, S is 8 in the case that N is 24, and S is 8 in the case that N is 32; or
every K ports of the N-port CSI-RS are multiplexed using a K-bit OCC, wherein K is 6 in the case that N is 18, K is 5 in the case that N is 20, and K is 7 in the case that N is 28; or each of the L groups of 8-port CSI-RSs in the N-port reference signal pattern is divided into two sub-groups of CSI-RSs, each of the two sub-groups of CSI-RSs is multiplexed using 4 code words of the 4-bit OCC, and each of the two sub-groups of CSI-RSs is mapped to RE positions corresponding to the 4-port CSI-RSs, wherein N is 24 or 32.

10. The reference signal mapping device according to claim 9, wherein the RE positions to which the N-port CSI-RS in the N-port reference signal pattern are mapped is the same as L*P RE positions to which L groups of the 8-port CSI-RSs in the 8-port reference signal pattern are mapped, wherein P is 6 or 8 in the case that N is 18, P is 5 or 8 in the case that N is 20, P is 7 or 8 in the case that N is 28, P is 8 in the case that N is 24, and P is 8 in the case that N is 32.

11. The reference signal mapping device according to claim 8, wherein in a normal Cyclic Prefix (CP) sub-frame comprising 14 Orthogonal Frequency Division Multiplexing (OFDM) symbols or a Downlink Pilot Time Slot (DwPTS) comprising 11 or 12 OFDM symbols, in the case that M is 4, the 4-port reference signal pattern comprises 10 groups of 4-port CSI-RSs,
wherein each of 4 groups of the 10 groups of 4-port CSI-RSs is mapped to 4 REs on the first to fourth OFDM symbols in a time division multiplexing mode, and each of the remaining 6 groups of 4-port CSI-RSs are mapped to 4 REs on the fifth and sixth OFDM symbols in the time division multiplexing mode in conjunction with a frequency division multiplexing mode, and
wherein the first to fourth OFDM symbols are symbols where DeModulation Reference Signals (DMRSs) are located.

12. The reference signal mapping device according to claim 8, wherein in a normal CP sub-frame comprising 14 OFDM symbols or a DwPTS comprising 11 or 12 OFDM symbols, in the case that M is 8, the 8-port reference signal pattern comprises 5 groups of 8-port CSI-RSs, and
wherein each of the 5 groups of 8-port CSI-RSs comprises two sub-groups of CSI-RSs, each of the two sub-groups of CSI-RSs is multiplexed using 4 code words of the 4-bit OCC, one of the two sub-groups of CSI-RSs is mapped to 4 REs on the first to fourth OFDM symbols in a time division multiplexing mode, and the other one of the two sub-groups of CSI-RSs is mapped to 4 REs on the fifth and sixth OFDM symbols in the time division multiplexing mode in conjunction with a frequency division multiplexing mode, wherein the first to fourth OFDM symbols are symbols where DMRSs are located; or
each of the 5 groups of 8-port CSI-RSs is mapped to 4 REs on the first to fourth OFDM symbols and 4 REs on the fifth and sixth OFDM symbols in the time division multiplexing mode in conjunction with the frequency division multiplexing mode, wherein the first to fourth OFDM symbols are symbols where DMRSs are located.

13. The reference signal mapping device according to claim 11, wherein in the normal CP sub-frame comprising 14 OFDM symbols, the first to fourth OFDM symbols are: the sixth and seventh OFDM symbols in a first time slot of the sub-frame, and the sixth and seventh OFDM symbols in a second time slot of the sub-frame, and wherein the fifth and sixth OFDM symbols are the third and fourth OFDM symbols in the second time slot of the sub-frame; or wherein in the DwPTS comprising 11 or 12 OFDM symbols, the first to fourth OFDM symbols are: the third and fourth OFDM symbols in a first time slot of the sub-frame, and the third and fourth OFDM symbols in a second time slot of the sub-frame, and wherein the fifth and sixth OFDM symbols are the sixth and seventh OFDM symbols in the first time slot of the sub-frame.

14. The reference signal mapping device according to claim 8, wherein in 12 OFDM symbols of an extended CP sub-frame, each of the plurality of groups of M-port CSI-RSs in the M-port reference signal pattern is mapped to the fifth and sixth OFDM symbols in a first time slot of the sub-frame and the fifth and sixth OFDM symbols in a second time slot of the sub-frame in a time division multiplexing mode in conjunction with a frequency division multiplexing mode.

15. A reference signal mapping method, comprising:
determining Resource Elements (REs) to which a Channel State Indication Reference Signal (CSI-RS) is mapped in accordance with an N-port reference signal pattern, N being an integer greater than 16, wherein RE positions to which an N-port CSI-RS in the N-port reference signal pattern is mapped are determined in accordance with RE positions to which a plurality of groups of M-port CSI-RSs in an M-port reference signal pattern are mapped, M being 4 or 8; and
performing resource mapping on the CSI-RS in accordance with the determined REs,
wherein N is 18, 20, 24, 28 or 32, M is 8, the RE positions to which the N-port CSI-RS in the N-port reference signal pattern is mapped are the same as RE positions to which L groups of 8-port CSI-RSs in an 8-port reference signal pattern are mapped, where in the case that N is 18 or 24, L is 3, and in the case that N is 20, 28 or 32, L is 4,
every S ports of the N-port CSI-RS are multiplexed using S code words in 8 code words of an 8-bit OCC, wherein S is 6 or 8 in the case that N is 18, S is 5 or 8 in the case that N is 20, S is 7 or 8 in the case that N is 28, S is 8 in the case that N is 24, and S is 8 in the case that N is 32; or
every K ports of the N-port CSI-RS are multiplexed using a K-bit OCC, wherein K is 6 in the case that N is 18, K is 5 in the case that N is 20, and K is 7 in the case that N is 28; or
each of the L groups of 8-port CSI-RSs in the N-port reference signal pattern is divided into two sub-groups of CSI-RSs, each of the two sub-groups of CSI-RSs is multiplexed using 4 code words of a 4-bit OCC, and each of the two sub-groups of CSI-RSs is mapped to RE positions corresponding to a 4-port CSI-RS, wherein N is 24 or 32.

16. The reference signal mapping method according to claim 15, wherein the RE positions to which the N-port CSI-RS in the N-port reference signal pattern is mapped are the same as L*P RE positions to which L groups of the 8-port CSI-RSs in the 8-port reference signal pattern are mapped, wherein P is 6 or 8 in the case that N is 18, P is 5 or 8 in the case that N is 20, P is 7 or 8 in the case that N is 28, P is 8 in the case that N is 24, and P is 8 in the case that N is 32.

17. The reference signal mapping method according to claim 15, wherein in a normal CP sub-frame comprising 14 OFDM symbols or a DwPTS comprising 11 or 12 OFDM symbols, in the case that M is 8, the 8-port reference signal pattern comprises 5 groups of 8-port CSI-RSs, and
wherein each of the 5 groups of 8-port CSI-RSs comprises two sub-groups of CSI-RSs, each of the two sub-groups of CSI-RSs is multiplexed using 4 code words of the 4-bit OCC, one of the two sub-groups of CSI-RSs is mapped to 4 REs on the first to fourth OFDM symbols in a time division multiplexing mode, and the other one of the two sub-groups of CSI-RSs is mapped to 4 REs on the fifth and sixth OFDM symbols in the time division multiplexing mode in conjunction with a frequency division multiplexing mode, wherein the first to fourth OFDM symbols are symbols where DMRSs are located; or
each of the 5 groups of 8-port CSI-RSs is mapped to 4 REs on the first to fourth OFDM symbols and 4 REs on the fifth and sixth OFDM symbols in the time division multiplexing mode in conjunction with the frequency division multiplexing mode, wherein the first to fourth OFDM symbols are symbols where DMRSs are located.

18. The reference signal mapping method according to claim 17, wherein in the normal CP sub-frame comprising 14 OFDM symbols, the first to fourth OFDM symbols are: the sixth and seventh OFDM symbols in a first time slot of the sub-frame, and the sixth and seventh OFDM symbols in a second time slot of the sub-frame, and wherein the fifth and sixth OFDM symbols are the third and fourth OFDM symbols in the second time slot of the sub-frame; or
wherein in the DwPTS comprising 11 or 12 OFDM symbols, the first to fourth OFDM symbols are: the third and fourth OFDM symbols in a first time slot of the sub-frame, and the third and fourth OFDM symbols in a second time slot of the sub-frame, and wherein the fifth and sixth OFDM symbols are the sixth and seventh OFDM symbols in the first time slot of the sub-frame.

19. The reference signal mapping method according to claim 15, wherein in 12 OFDM symbols of an extended CP sub-frame, each of the plurality of groups of M-port CSI-RSs in the M-port reference signal pattern is mapped to the fifth and sixth OFDM symbols in a first time slot of the sub-frame and the fifth and sixth OFDM symbols in a second time slot of the sub-frame in a time division multiplexing mode in conjunction with a frequency division multiplexing mode.

* * * * *